United States Patent
Kuboki

(10) Patent No.: US 8,693,017 B2
(45) Date of Patent: Apr. 8, 2014

(54) IMAGE FORMING APPARATUS, METHOD OF CONTROLLING THE SAME, PROGRAM, STORAGE MEDIUM, PRINTING SYSTEM, AND METHOD SUITABLE FOR THE PRINTING SYSTEM

(75) Inventor: Keiju Kuboki, Kanagawa (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/365,859

(22) Filed: Feb. 3, 2012

(65) Prior Publication Data

US 2012/0127505 A1 May 24, 2012

Related U.S. Application Data

(63) Continuation of application No. 12/263,845, filed on Nov. 3, 2008, which is a continuation of application No. 10/431,354, filed on May 7, 2003, now Pat. No. 7,456,980.

(30) Foreign Application Priority Data

May 9, 2002 (JP) ................................. 2002-133905
Apr. 17, 2003 (JP) ................................. 2003-113180

(51) Int. Cl.
*G06F 3/12* (2006.01)
*G06K 15/00* (2006.01)
*G03G 15/00* (2006.01)

(52) U.S. Cl.
USPC ........... 358/1.13; 358/1.1; 358/1.9; 358/1.16; 358/1.18; 399/361; 399/365; 399/381; 399/383; 399/407; 399/408; 399/410

(58) Field of Classification Search
USPC ............. 358/1.11–1.18, 1.1, 1.9, 2.1; 399/381–383, 365, 9, 15, 72, 407–410
See application file for complete search history.

(56) References Cited

U.S. PATENT DOCUMENTS

| | | | |
|---|---|---|---|
| 6,614,546 B1 * | 9/2003 | Kurozasa | 358/1.15 |
| 6,724,492 B1 * | 4/2004 | Iwase et al. | 358/1.13 |
| 6,757,500 B2 * | 6/2004 | Kuboki | 399/15 |
| 7,023,569 B2 * | 4/2006 | Kizaki | 358/1.13 |
| 7,315,387 B2 * | 1/2008 | Nishikawa | 358/1.15 |
| 8,134,722 B2 * | 3/2012 | Kuboki | 358/1.13 |
| 2003/0090695 A1 | 5/2003 | Murata | |

FOREIGN PATENT DOCUMENTS

| | | |
|---|---|---|
| JP | 7-299936 A | 11/1995 |
| JP | 10-291356 A | 11/1998 |
| JP | 2001-063849 A | 3/2001 |
| JP | 2001-277672 A | 10/2001 |
| JP | 2001-341361 A | 12/2001 |
| JP | 2003-266899 A | 9/2003 |

* cited by examiner

Primary Examiner — Chad Dickerson
(74) Attorney, Agent, or Firm — Rossi, Kimms & McDowell LLP

(57) ABSTRACT

There is provided an image forming apparatus capable of realizing a trial printing function that minimizes unnecessary consumption of time and supplies. Images that are inputted are accumulated in a memory. An output mode is set and a setting is made as to whether trial printing is to be carried out in the output mode or not. A CPU provides control to read out a corresponding image from the memory according to the set output mode and form the readout image on a sheet. When it is determined that the trial printing is to be carried out during image formation according to the set output mode, the CPU provides control to set the number of trial print pages according to predetermined conditions and carry out the trial printing for the set number of trial print pages.

6 Claims, 28 Drawing Sheets

FIG. 14
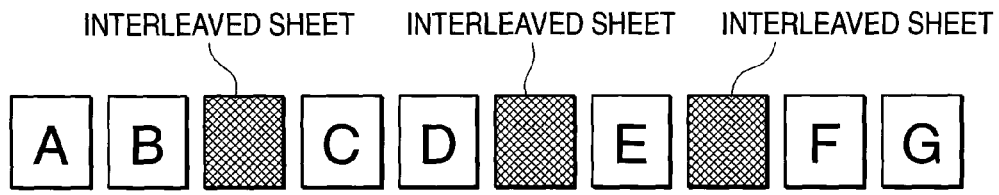
FIG. 15A
FIG. 15B
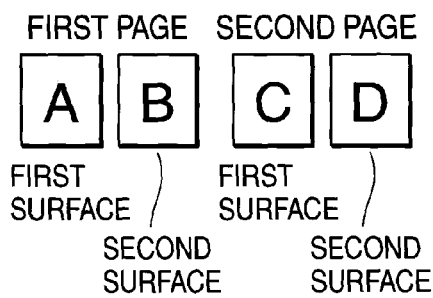
FIG. 15C
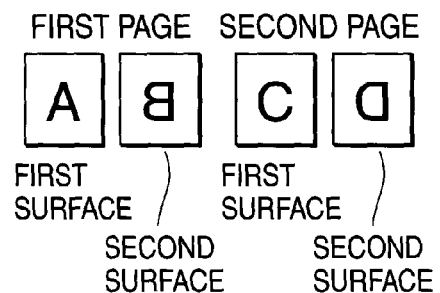
FIG. 16
[AUTOMATICALLY SET NUMBER OF TRIAL COPY PAGES]
| | |
|---|---|
| DOUBLE-SIDED | 2 PAGES |
| STAPLE | 2 PAGES |
| REDUCED LAYOUT | 1 PAGES |
| OTHERS | 1 PAGES |
OK

IMAGE FORMING APPARATUS, METHOD OF CONTROLLING THE SAME, PROGRAM, STORAGE MEDIUM, PRINTING SYSTEM, AND METHOD SUITABLE FOR THE PRINTING SYSTEM

This is a continuation of U.S. patent application Ser. No. 12/263,845 filed 3 Nov. 2008, which itself is a continuation of Ser. No. 10/431,354 filed 7 May 2003 (now U.S. Pat. No. 7,456,980), which is based on and claims priority from Japanese Application Numbers JP 2002-133905 filed on 9 May 2002, and JP 2003-113180 filed on 17 Apr. 2003. The disclosure of the priority applications, in their entirety, including the drawings, claims, and the specifications thereof, are herein incorporated by reference.

BACKGROUND OF THE INVENTION

1. Field of the Invention

The present invention relates to an image forming apparatus capable of performing trial printing, a method of controlling the same, a program for implementing the method, and a storage medium storing the program as well as a printing system and a method suitable for the printing system.

2. Description of the Related Art

In recent years, a digital copying machine having a plurality of functions has been developed. The digital copying machine reads an image on an original by a CCD (Charged Coupled Device) and converts it into a digital signal, and performs various processing on the digital signal and then converts it into a laser signal to record an image on a sheet by electrophotography. The digital copying machine also temporarily stores the read image data in an image memory such as a hard disk and reads out the image data to form an image. By repeating this sequence a plurality of times, the digital copying machine can realize an electronic sorting function. The digital copying machine can also perform image formation of one copy using the data stored in the image memory, and continues image formation or change setting modes according to the result of user's checking of the finish of the formed image. This is a so-called "trial printing function".

According to the trial printing function, however, all of read images are subjected to processing, and all of pages included in each copy are subjected to printing, and hence, time and supplies such as toners and sheets may be unnecessarily consumed. For example, the trial printing function may be sufficiently achieved in the case where printing is carried out for a plurality of pages, but even in this case, all of the pages are outputted on a copy-by-copy basis, which requires excess time for trial printing and unnecessarily consumes supplies such as toners and sheets.

SUMMARY OF THE INVENTION

It is therefore an object of the present invention to provide an image forming apparatus, a method of controlling the same, a printing system and a method suitable for the printing system, which are capable of realizing a trial printing function that minimizes unnecessary consumption of time and supplies, as well as a program for implementing the method for controlling the image forming apparatus, and a storage medium storing the program.

To attain the above object, in a first aspect of the present invention provides an image forming apparatus comprising an image input device that inputs images, an image accumulating device that accumulates the images inputted by the image input device, an output mode setting device that sets an output mode and makes a setting as to whether trial printing is to be carried out in the output mode, and a control device that provides control to read out a corresponding image from the image accumulating device according to the set output mode, and to form the readout image on a sheet, and wherein the control device is operable when the setting has been made such that the trial printing is to be carried out during image formation according to the set output mode, for setting a number of trial print pages according to predetermined conditions, and carrying out the trial printing on the set number of trial print pages.

With the above arrangement, in the case where trial printing is instructed to be carried out during image formation according to the set output mode, the number of trial print pages is set according to predetermined conditions to perform trial printing for the set number of trial print pages. As a result, it is possible to realize a trial printing function that minimizes unnecessary consumption of time and consumable supplies.

Preferably, the image forming apparatus according to the first aspect comprises an output mode changing device that changes the set output mode, and a trial printing cancellation device that cancels the trial printing, and wherein the control device is operable when image formation is suspended after the trial printing, the output mode is changed by the output mode changing device during suspension of the image formation, and the trial printing is canceled by the trial printing cancellation device, for providing control to resume image formation according to an output mode changed from the set output mode.

More preferably, the control device is operable when image formation is suspended after the trial printing, and the output mode is changed by the output mode changing device during suspension of the image formation without the trial printing being canceled by the trial printing canceling device, for providing control to again carry out the trial printing according to the output mode changed from the set output.

Preferably, the image forming apparatus according to the aspect comprises a condition setting device that sets one of manual setting, automatic setting, and all-page setting as conditions for setting the number of trial print pages, and wherein the control device sets the number of trial print pages according to the conditions set by the condition setting device and the set output mode.

More preferably, the control device is operable when the manual setting is set by the condition setting device, for setting a number of trial print pages set by a user as the number of trial print pages irrespective of the output mode.

Also preferably, the control device is operable when the all-page setting is set by the condition setting device, for setting a number of all pages as the number of trial print pages irrespective of the output mode.

Further preferably, the control device is operable when the automatic setting is set by the condition setting device, for setting the number of trial print pages according to the output mode.

Preferably, the image forming apparatus according to the first aspect comprises a condition setting device that sets one of manual setting, automatic setting, and all-page setting as conditions for setting the number of trial print pages, and wherein the image input device is capable of carrying out sequential reading in which a plurality of originals are sequentially read, and wherein the control device sets the number of trial print pages according to the conditions set by the condition setting device and the set output mode.

More preferably, the control device is operable when the manual setting is set by the condition setting device, for setting a number of pages set by a user as the number of trial print pages irrespective of the output mode.

Still more preferably, the control device is operable when the all-page setting is set by the condition setting device, for setting a number of all pages as the number of trial print pages irrespective of the output mode.

Also preferably, the image forming apparatus according to the first aspect comprises an output mode changing device that changes the set output mode during a period of time from completion of present reading of the original to start of next reading of the original during the sequential reading, and wherein the control device is operable when the output mode is changed by the output mode changing device in a case where the automatic setting is set by the condition setting device, for setting the number of trial print pages according to an output mode changed from the set output mode.

Further preferably, the control device is operable when the output mode is changed by the output mode changing device in a case where the automatic setting is set by the condition setting device, for setting a predetermined number of pages from a page obtained by the next reading of the original as the number of trial print pages according to an output mode changed from the set output mode.

To attain the above object, in a second aspect of the present invention, the present invention provides a method of controlling an image forming apparatus comprising an image input device that inputs images, an image accumulating device that accumulates the images inputted by the image input device, an output mode setting device that sets an output mode and makes a setting as to whether trial printing is to be carried out in the output mode, and wherein a corresponding image is read out from the image accumulating device according to the set output mode to form the readout image on a sheet, the method comprising a number-of-print pages setting step of setting a number of trial print pages according to predetermined conditions when the setting has been made such that the trial printing is to be carried out during image formation according to the set output mode, and a control step of providing control to carry out the trial printing on the set number of trial print pages.

Preferably, the method according to the second aspect comprises an image formation suspending step of suspending image formation after the trial printing, and an output mode changing step of changing the set output mode during the suspension of the image formation, and wherein the control step comprises providing control to resume image formation according to an output mode changed from the set output mode when the trial printing is canceled after the output mode is changed.

More preferably, the control step comprises providing control to carry out the trial printing again according to an output mode changed from the set output mode when image formation is suspended after the trial printing, and the output mode is changed during suspension of the image formation without the trial printing being canceled.

Preferably, the method according to the second aspect comprises a condition setting step of setting one of manual setting, automatic setting, and all-page setting as conditions for setting the number of trial print pages, and wherein the number-of-print pages setting step comprises setting the number of trial print pages according to the set conditions and the set output mode.

More preferably, the number-of-print pages setting step comprises setting a number of trial print pages set by a user as the number of trial print pages irrespective of the output mode when the manual setting is set in the condition setting step.

Further preferably, the number-of-print pages setting step comprises setting a number of all pages as the number of trial print pages irrespective of the output mode when the all-page setting is set in the condition setting step.

Still further preferably, the number-of-print pages setting step comprises setting the number of trial print pages according to the output mode when the automatic setting is set in the condition setting step.

Preferably, the image input device is capable of carrying out sequential reading in which a plurality of originals are sequentially read, wherein the method comprises a condition setting step of setting one of manual setting, automatic setting, and all-page setting as conditions for setting the number of trial print pages, and wherein the number-of-print pages setting step comprises setting the number of trial print pages according to the conditions set in the condition setting step and the set output mode.

More preferably, the number-of-print pages setting step comprises setting a number of pages set by a user as the number of trial print pages irrespective of the output mode when the manual setting is set in the condition setting step.

Still more preferably, the number-of-print pages setting device comprises setting a number of all pages as the number of trial print pages irrespective of the output mode when the all-page setting is set in the condition setting step.

Also preferably, the method according to the second aspect comprises an output mode changing step of changing the set output mode during a period of time from completion of present reading of the original to start of next reading of the original during the sequential reading, and wherein the number-of-print pages setting step comprises setting the number of trial print pages according to an output mode changed from the set output mode when the output mode is changed in the output mode changing step in a case where the automatic setting is set in the condition setting step.

Preferably, the number-of-print pages setting step comprises setting a predetermined number of pages from a page obtained by the next reading of the original as the number of trial print pages according to an output mode changed from the set output mode when the output mode is changed in the output mode changing step in a case where the automatic setting is set in the condition setting step.

To attain the above object, in a third aspect of the present invention, the present invention provides a program for controlling an image forming apparatus comprising an image input device that inputs images, an image accumulating device that accumulates the images inputted by the image input device, an output mode setting device that sets an output mode and makes a setting as to whether trial printing is to be carried out in the output mode, and wherein a corresponding image is read out from the image accumulating device according to the set output mode to form the readout image on a sheet, the program comprising a number-of-print pages setting module for setting a number of trial print pages according to predetermined conditions when the setting has been made such that the trial printing is to be carried out during image formation according to the set output mode, and a control module for providing control to carry out the trial printing on the set number of trial print pages.

To attain the above object, in a fourth aspect of the present invention, the present invention provides a computer-readable storage medium storing the program according to the third aspect.

To attain the above object, in a fifth aspect of the present invention, the present invention provides a method suitable for a printing system including a printing apparatus capable of carrying out trial printing on a print job to print out N copies (N is equal to or greater than 2), comprising a selecting step of selecting any mode from a plurality of jobs including an all-page mode in which P copies (P is a predetermined value) of the print job are printed out in trial printing according to printing conditions set for the print job, and a non all-page mode in which copies in a number less than P of the print job are printed out in trial printing according to the printing conditions set for the print job, a changing step of allowing settings as to printing conditions for the print job to be changed after trial printing, and a control step of providing control to carry out the print job according to new printing conditions after change of the settings when the settings are changed in the changing step, and to carry out the print job according to the printing conditions before change of the settings when the settings are not changed in the changing step, and wherein the control step comprises providing control to print out A copies (A=N−P) of the print job printed in the all-page mode according to the printing conditions before change of the settings when the settings as to the printing conditions for the print job subjected to trial printing in the all-page mode are not changed in the changing step, and to print out N copies of the print job subjected to trial printing in the non all-page mode according to the printing conditions before change of the settings even when the settings as to the printing conditions are not changed in the changing step.

To attain the above object, in a sixth aspect of the present invention, the present invention provides a printing system including a printing apparatus capable of carrying out trial printing of a print job, comprising a selector that selects a manual mode in which a number of pages to be outputted in trial printing can be arbitrarily designated by a user irrespective of a number of pages of originals included in the print job, and a controller operable when the selector selects the manual mode, for providing control to carrying out trial printing to print out pages in the number designated by the user.

The above and other objects, features, and advantages of the invention will become more apparent from the following detailed description taken in conjunction with the accompanying drawings.

BRIEF DESCRIPTION OF THE DRAWINGS

FIG. 14 is a view schematically showing an example in which an interleaved sheet is inserted between output pages in an interleaved sheet mode;

FIG. 15A is a view showing an example of an original read in a double-sided printing mode;

FIG. 15B is a view showing an example of trial copying in a horizontal spread double-sided printing mode;

FIG. 15C is a view showing an example of trial copying in a vertical spread double-sided printing mode;

FIG. 16 is a view showing an example of a screen for presetting the number of pages for automatic page calculation during trial copying;

DETAILED DESCRIPTION OF THE PREFERRED EMBODIMENTS

The present invention will now be described in detail with reference to the drawings showing embodiments thereof.

Figure 1:
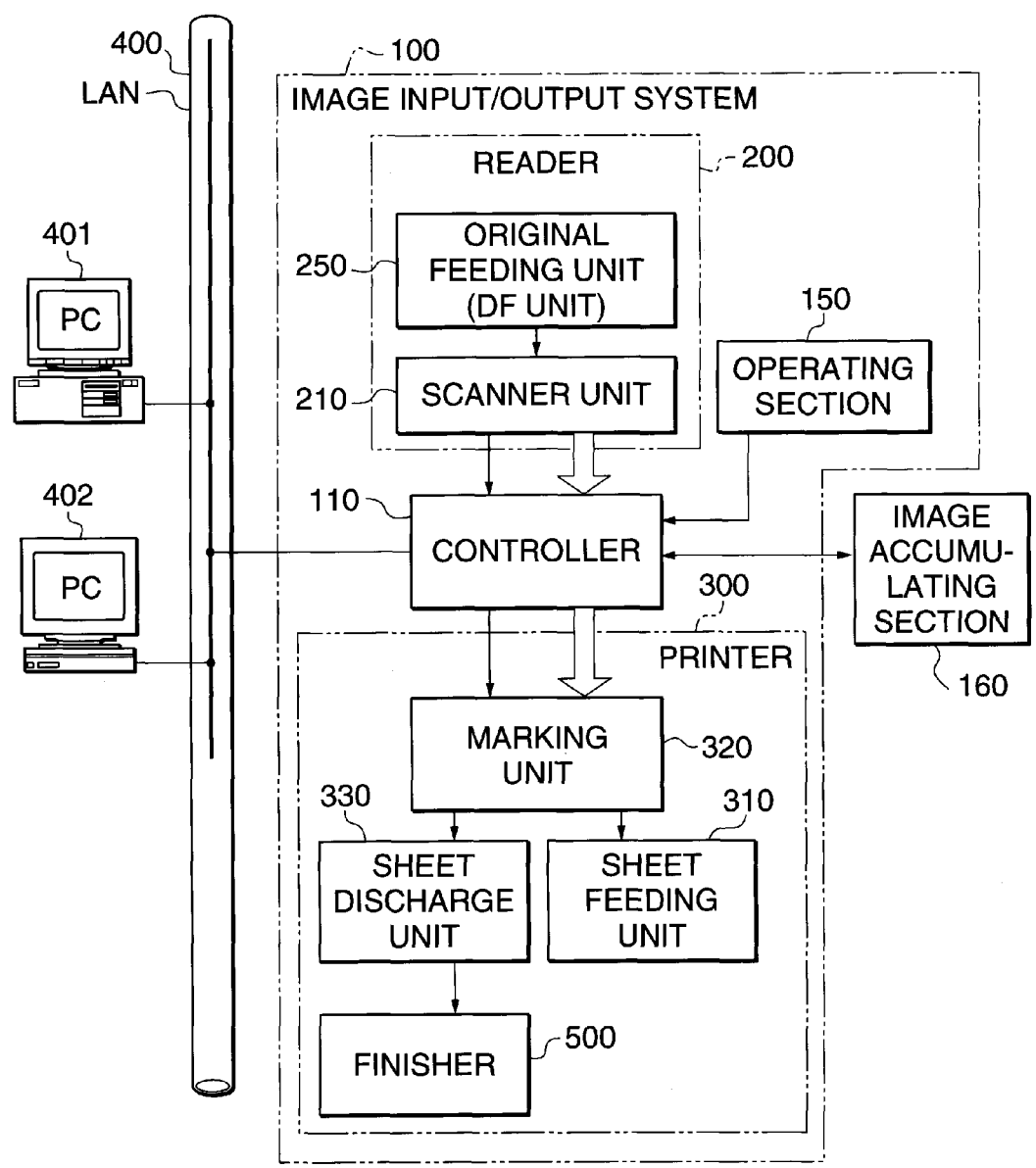
FIG. 1 is a block diagram showing the entire arrangement of an image input/output system as a printing system according to a first embodiment of the present invention.

FIG. 1 is a block diagram showing the entire arrangement of an image input/output system as a printing system according to a first embodiment of the present invention.

As shown in FIG. 1, an image input/output system 100 is comprised of a reader 200 that optically reads an image on an original and converts the read image into image data; a printer 300 that feeds a sheet, prints image data as a visual image on the sheet, and discharges the sheet from the printer 300; and a controller 110 that controls the reader 200 and the printer 300.

The reader 200 is comprised of an original feeding unit (DF unit) 250 that feeds an original, and a scanner unit 210 that reads an original.

The printer 300 is comprised of a sheet feeding unit 310 including different types of sheet cassettes, a marking unit 320 that transfers and fixes image data on a sheet, a sheet discharge unit 330 that outputs a sheet with an image printed thereon from the printer 300, and a finisher unit 500 that performs stapling, sorting, and so forth.

The controller 110 is electrically connected to the reader 200 and the printer 300, and is also connected to host computers (PC) 401 and 402. The controller 110 controls the reader 200 to read image data from an original, and controls the printer 300 to provide a copying function of outputting the image data onto a sheet. The controller 110 also provides a scanner function of converting image data read from the reader 200 into code data and transmitting the code data to the host computers 401 and 402 via a LAN 400, and a printer function of converting the code data received from the host computers 401 and 402 via the LAN 400 into image data and outputting the same to the printer 300.

An image accumulating section 160 where image data read by the reader 200 are accumulated is connected to the controller 110. The printer 300 is capable of reading out image data from the image accumulating section 160 via the controller 110, and printing the read image data. Thus, the printer 300 is capable of reading and printing an original asynchronously. Also, the printer 300 is capable of reading out image data, which has been read once, a plurality of times and printing the same, thus realizing an electronic sorting function and a trial copying function (trial printing mode).

For example, in the case where the user has selected the trial printing mode through the operation of the operating section 150, the controller 110 causes related component units to operate as described below. First, a processing mode (such as a reduced layout processing mode, an enlarged layout mode, a staple mode, an image rotation mode, a duplex copy mode, a page printing mode) set by the user through the operation of the operating section 150, a setting parameter (such as a setting parameter indicative of the number of images (e.g., 2, 4, 8, 9, or 16) to be arranged on a sheet in the case where the reduced layout mode is selected) as processing conditions set in the set mode, and a setting parameter indicative of the arrangement of a plurality of images (for example, in a 4 inl mode, a parameter indicative of how respective images on the first through fourth pages are laid out in upper left, upper right, lower left, and lower right regions on one surface of a sheet) are temporarily stored and held in a memory. Then, processing is performed based on a print job (image data) captured into a memory (such as a hard disk) according to the stored mode information and parameter data. The printing result is outputted as a trial printout so that the user can check it. The user then checks the printing result outputted by trial printing.

On this occasion, if the printing result has no problem and the user inputs an instruction for allowing the printing result to be outputted without change on the printing conditions set first, printing is performed based on the print job according to the number of print copies (and/or the number of print pages) based on the number of print copies (and/or the number of print pages) set by the user in the first setting as to printing and the number of print copies outputted in trial printing (and/or the number of print pages) and on the processing conditions set by the user. For example, it is assumed that the user makes a setting to print out five copies of a bundle of five-page originals (one job) as original data of one job in a state in which the user has designated the trial printing mode. In this case, it is assumed that a part (in this case, 5 pages×1 copy) of a bundle of first to fifth pages is outputted in trial printing according to the processing conditions set by the user. Then, in response to the input of an instruction for continuing printing without changing the printing conditions from the user, the controller 110 provides control to subtract 1 as the number of copies set for trial printing from 5 as the number of copies set first, and to print out four copies (5 pages×4 copies) according to the same printing conditions as the printing conditions set earlier. This is intended to minimize unnecessary printouts because the output results of trial printing can be counted as proper output results.

On the other hand, if the user determines that the trial printing result is not his/her desired one, and thus inputs an instruction for changing the printing conditions set earlier and performing printing under different printing conditions through the operation of the operating section 150, the controller 110 causes a variety of UI screens, which enable the user to change settings, to be displayed on the operating section 150, so that the user can change the printing conditions via the screens (for example, from a double-sided printing mode to a one-sided printing mode, or from a non-sort mode to the staple mode). After the printing conditions are changed, processing is performed based on the print job stored in the memory according to newly set printing conditions, so that the print job can be printed out. As described above, if the user changes the printing conditions after trial printing, the controller 110 performs printing by setting the number of print copies (and/or the number of print pages) to be outputted after trial printing to the number of print copies set first by the user (in this case, 5 pages×5 copies). This is intended to obtain an output result (printing result) desired by the user over again since the user determines that the output result is not a desired one and the printing result should be regarded as being invalid.

In this way, the controller 110 controls the trial printing mode to adjust the number of print pages to be outputted after trial printing according to information indicative of the number of print copies (and/or the number of print pages) set by the user before trial printing, information indicative of the number of print copies (and/or the number of print pages)

outputted in trial printing, and an instruction inputted by the user after trial printing (i.e., an instruction for continuing printing under the same printing conditions as in trial printing, or an instruction for performing printing again under printing conditions different from trial printing conditions), to thereby produce printouts.

In particular, according to the present embodiment, the number of printout pages of a print job in trial printing can be adjusted according to a wide variety of needs from the user.

For example, assuming that one job consisting of printing out a bundle of one-hundred page originals in the trial printing mode, it is possible to eliminate such a problem that all of one-hundred pages are outputted by printing out one copy of the job as trial printing as in the prior part, even when the user can check the output result only by printing out predetermined pages such as a top page or by printing out a predetermined number of output sheets such as one output sheet (for example, when the user wishes to check only the color of a color output or the like, or wishes to check only the area where an image will be printed or the direction of an image to be printed).

To solve the above described problem, according to the present embodiment, the controller 110 provides control to properly adjust the number of pages to be outputted during trial printing in the trial printing mode.

For example, the controller 110 has a plurality of modes for determining the number of print pages to be outputted in trial printing, such as a first mode in which all pages of originals included in one print job to be processed in trial printing are printed out (in the above example, all of one-hundred pages are printed out, i.e., one copy is printed out), a second mode in which the number of print pages to be outputted in trial printing can be arbitrarily designated by the user irrespective of the number of pages of originals included in one job to be processed in trial printing (in the above example, an arbitrary number of output pages or an arbitrary number of pages of originals can be designated by the user irrespective of the fact that one-hundred page originals are included in one job), and a third mode in which the controller 110 provides control to carry out trial printing by automatically determining the number of print pages to be outputted in trial printing according to printing conditions (such as the processing mode, the setting parameters, and so forth) set by the user for a print job irrespective of the number of pages of originals included in the print job to be processed in trial printing, (for example, if the double-sided printing mode is set by the user, trial printing is performed to print out pages in a number preset for the double-sided printing mode, and if the staple mode is set by the user, trial printing is performed to print out pages in a number preset for the staple mode). It is configured that the user can select a desired one from among these modes (three modes in this example).

Incidentally, in the present embodiment, the first mode corresponds to an "all-page" mode in an example of an operating screen in FIG. 9, referred later; the second mode corresponds to a "manual" mode in FIG. 9; and the third mode corresponds to an "automatic" mode in FIG. 9, and it is configured that the user can select a desired one from among these modes via a UI screen in FIG. 9, described later.

Further, although described later in detail with reference to FIG. 16 showing an example of an operating screen, to execute the "automatic" mode, the user presets the number of print pages to be outputted in trial printing according to each processing mode which can be set by the user, and the preset number of print pages is stored and held in a memory, not shown, in the form of table data, for example. In this case, if the "automatic" mode is selected, the number of print pages corresponding to the processing mode set by the user is retrieved from the table data, so that trial printing is carried out to output pages in a number corresponding to the retrieved number of print pages.

Further, according to the present embodiment, in connection with the above described control, the controller 110 also controls the number of print copies (and/or the number of print pages) to be outputted in real printing which should be carried out after trial printing.

For example, in the case where the user selects the "all-page" mode from among the "all-page" mode, the "manual" mode, and the "automatic" mode for determining the number of print pages to be outputted in trial printing, all pages of a print job are subjected to trial printing, that is, one copy is printed out by trial printing (although in the present embodiment, a predetermined number of copies is set to 1 in the "all-page" mode, the present invention is not limited to this, but a predetermined number of copies may be arbitrarily determined). Therefore, in the case where the user confirms that the trial printing result is proper, and inputs an instruction for continuing printing without change (after cancellation of trial printing), the controller 110 provides control to perform printing to produce printout copies in a number corresponding to the difference obtained by subtracting 1 from the number of copies set by the user as described above.

In the case of the "manual" mode, however, the user can arbitrarily designate the number of print pages to be outputted in trial printing and printing is performed according to the designated number of print pages, and therefore, one copy of a print job is not outputted in trial printing (for example, only five pages among one-hundred pages are printed). Similarly in the case where the "automatic" mode is selected, trial printing is carried out to print out pages in a number according to the processing mode set by the user (for example, in the case where the staple mode is selected, trial printing is carried out to print out pages in a number according to the staple mode).

Accordingly, when the "manual" mode or the "automatic" mode is selected, the controller 110 controls the number of print copies to be outputted after trial printing to the number of copies set first by the user irrespective of the number of print pages outputted during trial printing even if the user gives an instruction for continuing printing without making any changes to settings after trial printing.

Thus, assuming that a print job whose number of copies is set to 10 by the user is processed, the controller 110 provides control as described below, for example.

(1) Select "the number of trial print pages: all pages"→print out one copy of the print job during trial printing→"the user has changed settings"→print out ten copies according to new settings as to printing (new settings as to printing after the user changes settings) after cancellation of trial printing.

(2) Select "the number of trial print pages: all pages"→print out one copy of the print job during trial printing→"the user has not changed settings"→print out nine copies according to the original settings as to printing (i.e., under the same printing conditions as in trial printing) after cancellation of trial printing.

Incidentally, in the present embodiment, it is assumed that the number of print copies set by initial setting as to a print job is designated by N (in the above example, N=10), and the number of print copies outputted in trial printing is designated by a predetermined number P (in the above example, P=1). The value of N is one of print job printout conditions set by the user in initial setting before execution of the trial printing mode (in the above example, N=10). N is equal to or greater than 2 (i.e., a print job whose number of copies is plural is only applied, and a print job whose number of copies is 1 is not applied.). P may be equal to 1 or may be set to an arbitrary number according to the user mode or the like. To find the number of print copies to be outputted after trial printing in the above example (2), the controller 110 performs calculation according to the following expression:

$$N-P=A$$

where N is equal to or greater than 2.

The controller 110 then provides control to print out A copies in real printing according to the calculation result. Therefore, in the above example, ten minus one equals nine with the respective corresponding values being substituted for N−P=A, and accordingly, the controller 110 provides control to print out nine copies in real printing.

(3) Select "the number of trial print pages: manual"→print out copies of the print job in a number set by the user during trial printing→"the user has changed settings"→print out ten copies according to new settings as to printing after cancellation of trial printing.

(4) Select "the number of trial print pages: manual"→print out copies of the print job in number set by the user during trial printing→"the user has not changed settings"→print out ten copies according to the original settings as to printing after cancellation of trial printing.

As is clear from the above example (4), in the case where trial printing is carried out in the "manual" mode, even if the user has not changed the printing conditions after trial printing, N copies (in the above example, 10) are printed out in real printing without printing out N−P copies (in the above example, 10−1).

(5) Select "the number of trial print pages: automatic"→print out copies of the print job in a number according to the processing mode set for the print job during trial printing→"the user has changed settings"→print out ten copies according to new settings as to printing after cancellation of trial printing.

(6) Select "the number of trial print pages: automatic"→print out copies of the print job in a number according to the processing mode set for the print job during trial printing→"the user has not changed settings"→print out ten copies according to the original settings as to printing after cancellation of trial printing.

As is clear from the above example (6), in the case where trial printing is carried out in the "automatic" mode, even if the user has not changed the printing conditions after trial printing, N copies (in the above example, 10) are printed out in real printing without printing out N−P copies (in the above example, 10−1) as in the above example (2).

As is clear from comparison between the above examples (2), (4), and (6), according to the present embodiment, the controller 110 properly adjusts the number of print copies to be outputted after trial printing according to which modes is selected for trial printing from among the "all-page" mode, the "manual" mode, and the "automatic" mode even in the case where the user has not changed settings and gives an instruction for continuing printing without change after trial printing.

Providing control in different ways according to modes as described above improves the usability (increasing the throughput and preventing unnecessary printouts) in trial printing, and hence ensures proper printing results by preventing such troubles that copies in a number required by the user cannot be outputted. As a result, it is possible to improve the usability and ensure desired printing results in trial printing at the same time.

As a variation, among the above described three modes (the "all-page" mode, the "manual" mode, and the "automatic" mode), the controller 110 provides control to automatically set one mode or allows one mode to be selected while prohibiting the other from being set at a time point the user sets a predetermined processing mode such as the staple mode, the reduced layout mode or the double-sided printing mode for a print job subjected to trial printing.

Figure 9:
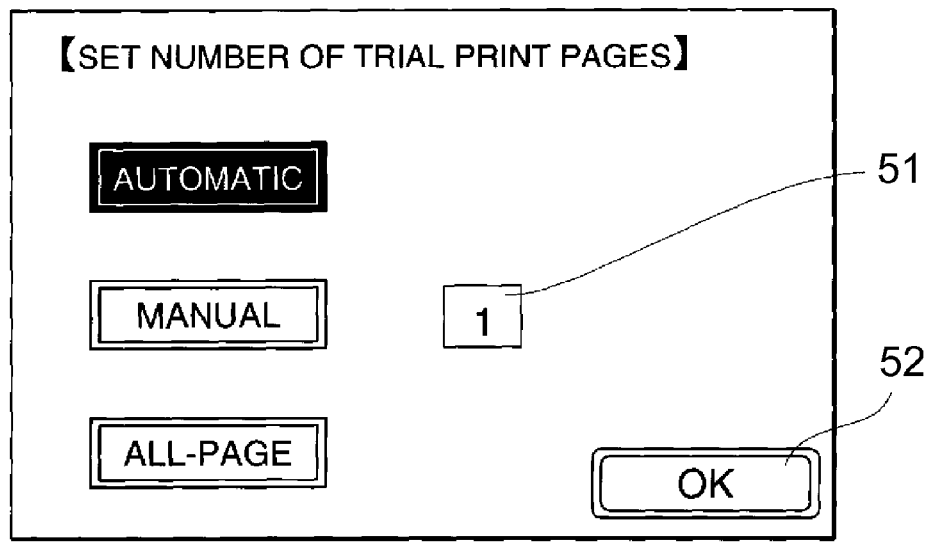
FIG. 9 is a view showing a state in which a trial copy key 50 is displayed inverted when a trial copy mode is on in a step S61 in FIG. 5.

For example, assuming that the staple mode, the double-sided printing mode, or the reduced layout mode has been set for a print job subjected to trial printing, the controller 110 provides control to hatch the "manual" key on the operating screen in FIG. 9 to prohibit the "manual" mode among the three modes from being executed, so that only the "automatic" mode and the "all-page" mode are allowed to be selected but the "manual" mode is prohibited from being selected by the user.

Further, assuming that the staple mode, the double-sided printing mode, or the reduced layout mode has been set for a print job subjected to trial printing, the controller 110 provides control to automatically set the "automatic" mode even if the user does not select any mode on the operating screen in FIG. 9.

Further, an operating section 150 is connected to the controller 110. The operating section 150 is comprised of a liquid crystal display (LCD) with a touch panel to provide a user I/F for operating the image input/output system 100. The details of the operating section 150 will be described later.

Figure 2:
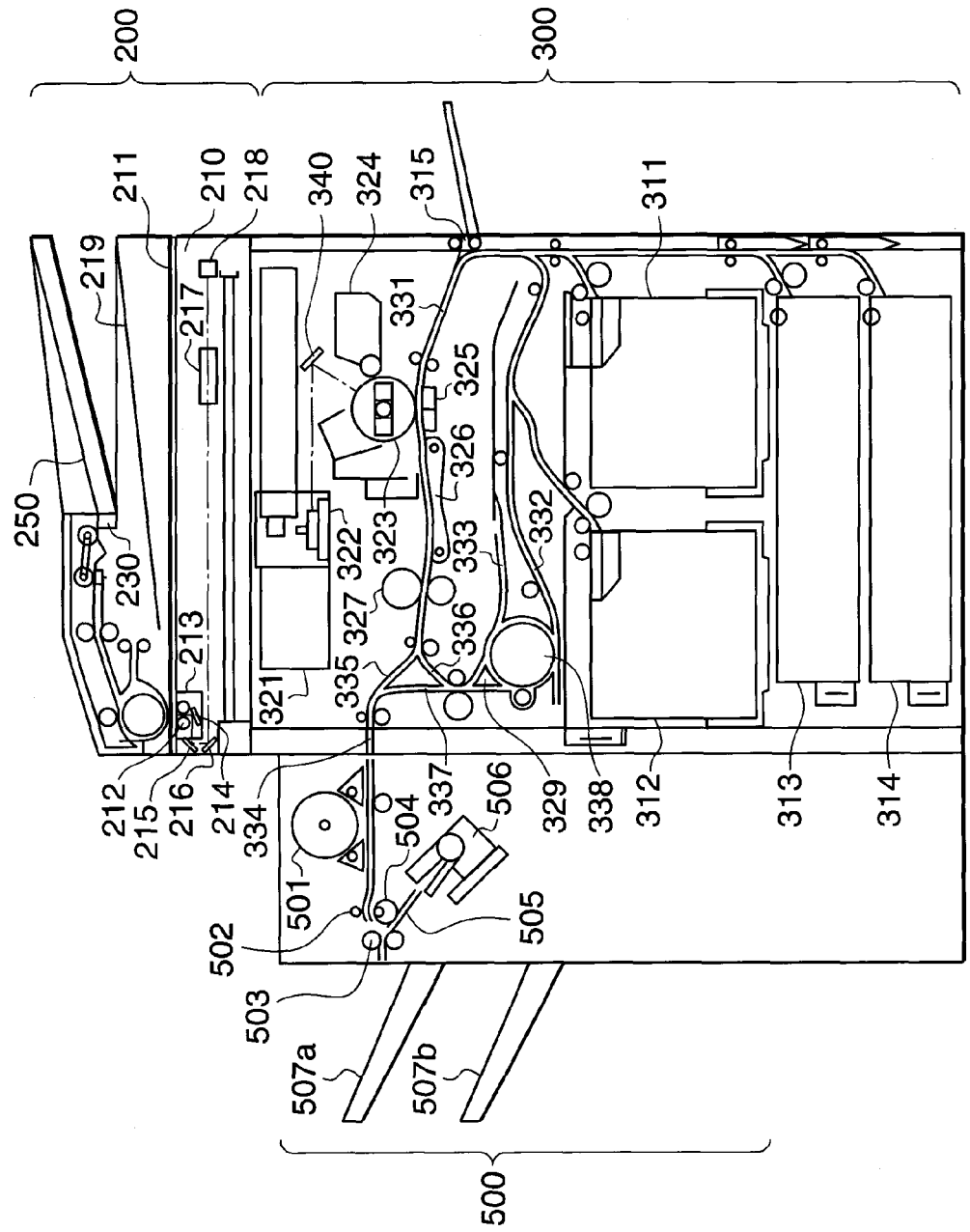
FIG. 2 is a sectional view showing the construction of a reader and a printer in the image input/output system in FIG. 1.

A description will now be given of the construction of the reader 200 and the printer 300 with reference to FIG. 2. FIG. 2 is a sectional view showing the construction of the reader 200 and the printer 300 in the image input/output system 100 in FIG. 1.

The original feeding unit (DF unit) 250 of the reader 200 feeds originals one by one from the top one onto a platen glass 211, and discharges each original on the platen glass 211 onto a discharge tray 219 after the scanner unit 210 finishes reading the original. The original feeding unit 250 is provided with a sensor 230 that detects the presence of an original. In the scanner unit 210, when an original has been conveyed onto the platen glass 211, a lamp 212 is turned on, and an optical unit 213 starts moving to scan the original by exposure. Light reflected from the original on this occasion is guided to a CCD image sensor (hereinafter referred to as the "CCD") 218 via optical elements such as mirrors 214, 215, 216, and a lens 217. An image on the original thus scanned is read by the CCD 218. Image data outputted from the CCD 218 is subjected to predetermined processing, and then transferred to the controller 110.

The printer 300 includes a laser driver 321 that drives a laser emitting section 322. The laser driver 321 causes the laser emitting section 322 to emit laser light according to image data outputted from the controller 110. The laser light is irradiated onto a photosensitive drum 323, so that a latent image based on the laser light is formed on the photosensitive drum 323. The latent image formed on the photosensitive drum 323 is turned into a visual image as a developed image by a developing agent supplied from a developer 324.

A sheet is fed from any of cassettes 311, 312, 313, 314, and a manual feed cassette 315 in timing synchronous with the start of the irradiation of laser light, and is conveyed toward a transfer section 325 via a transfer path 331. The transfer section 325 transfers the developed image on the photosensitive drum 323 onto the conveyed sheet. The sheet onto which the developed image has been transferred is conveyed to a fixing section 327 by a conveying belt 326.

The fixing section 327 fixes the developed image on the sheet by thermally pressuring it. The sheet having passed the fixing section 327 is discharged from the printer 300 via a conveying path 335 and a conveying path 334. In the case where the sheet is discharged with its surface on which an image is formed (print surface) being inverted, the sheet having passed the fixing section 327 is guided once to a conveying path 336 and a conveying path 338, and then conveyed in the opposite direction and discharged from the printer 300 via a conveying path 337 and the conveying path 334. Further, in the case where a double-sided printing mode is designated, the sheet having passed the fixing section 327 is guided from the conveying path 336 to a conveying path 333 by a flapper 329. The sheet is then conveyed in the opposite direction to be guided to the conveying path 338 and a sheet refeed conveying path 332 by the flapper 329. The sheet guided to the sheet refeed conveying path 332 is fed to the transfer section 325 via a conveying path 331 in the above-mentioned timing.

The sheet discharged from the printer 300 via the conveying path 334 is conveyed to the finisher unit 500. The sheet conveyed to the finisher unit 500 is sent first to a buffer unit 501. As the case may be, the buffer unit 501 performs buffering by winding the conveyed sheet around a buffer roller. For example, in the case where it takes a long time to perform processing such as stapling at a location downstream of the buffer unit 501, the use of the buffer unit 501 enables the conveying speed of the sheet conveyed from the main body of the printer 300 to be maintained at a constant speed, thus increasing the throughput.

The sheet conveyed from the buffer unit 501 is discharged onto a sheet discharge tray 507a by a pair of upstream discharge rollers 502 and a pair of downstream discharge rollers 503. In the case where a staple mode has been designated, the sheet is conveyed by the pair of upstream discharge rollers 502, and immediately after the rear end of the sheet is released from the pair of upstream discharge rollers 502, the sheet is pulled back by a knurling belt 504 and discharged onto a staple tray 505.

When a predetermined number of sheets have been stacked on the staple tray 505, the staple unit 506 staples these sheets into a bundle, and the bundle of the stapled sheets is discharged onto the discharge tray 507a by the pair of downstream discharge rollers 503.

In the present embodiment, two discharge trays 507a and 507b are provided which are capable of being moved up and down by a driving unit, not shown, such that one of the discharge trays 507a and 507b moves in response to the movement of the other. Although in FIG. 2, the sheet discharge tray 507a is disposed at a location to which a sheet is to be discharged, but it may be moved up so that the sheet can be discharged onto the discharge tray 507b.

Figure 3:
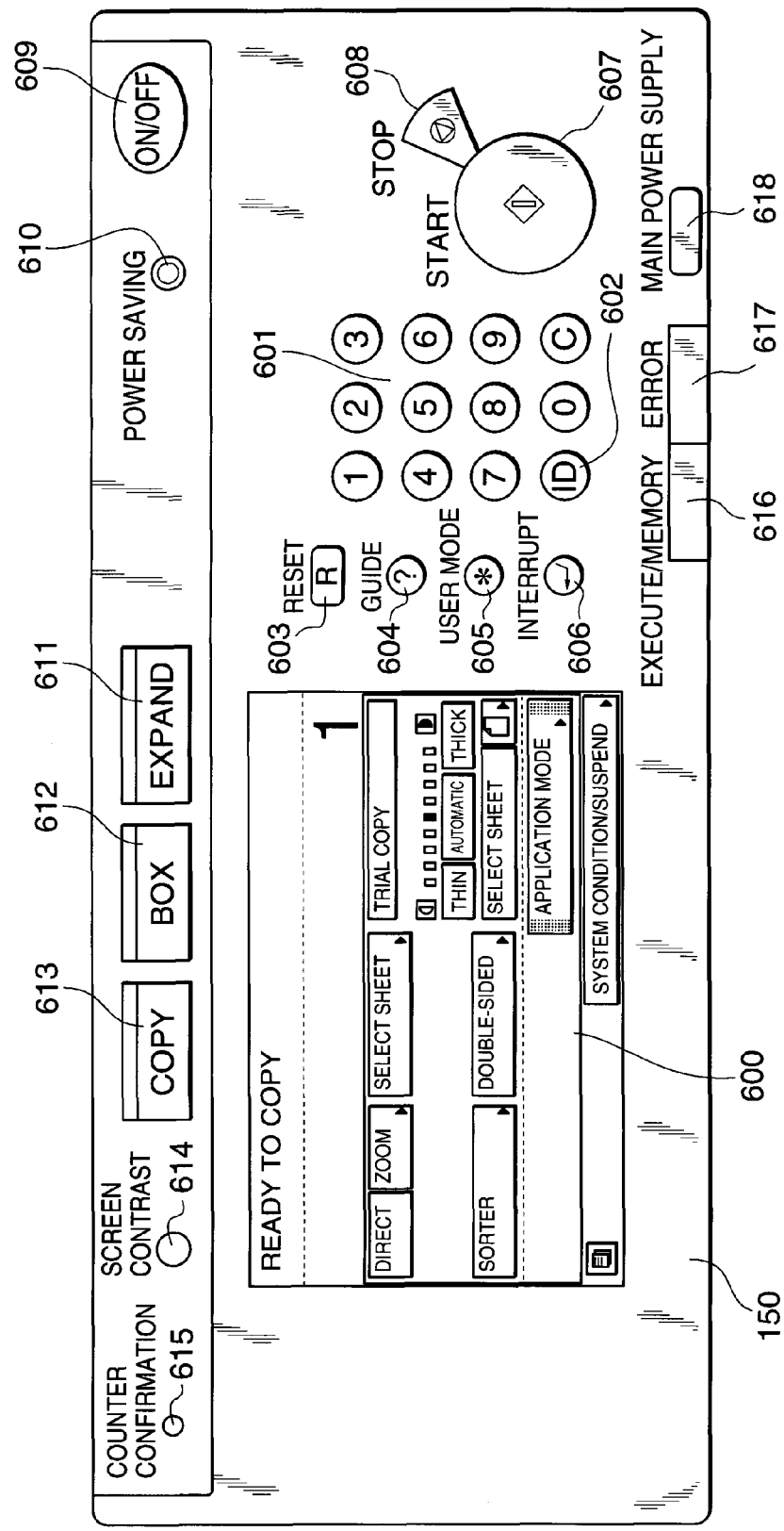
FIG. 3 is a view showing an operating section 150 in the image input/output system in FIG. 1.

A description will now be given of the operating section 150 with reference to FIG. 3. FIG. 3 illustrates the operating section 150 of the image input/output system in FIG. 1.

As shown in FIG. 3, the operating section 150 is comprised of an LCD 600 with a touch panel, which is intended to set main modes and display conditions, as well as a plurality of keys. The plurality of keys include a numeric key pad 601 for inputting numeric values from 0 to 9, an ID key 602 for inputting a department number and a password in the case where the image input/output system is managed according to departments (departmental management), a reset key 603 for resetting the set mode, a guide key 604 for displaying an instruction screen relating to each mode, a user mode key 605 for entering a user mode screen, and an interrupt key 606 for carrying out interruptive copying.

Further, the plurality of keys include a start key 607 for starting copy and a stop key 608 for suspending a copy job being executed. Further, the operating section 150 is comprised of a soft power switch 609, which is depressed to turn off a backup light of the LCD 600 to bring the image input/output system into a low-power mode. The plurality of keys further include a power-saving key 610, which is depressed to bring the image input/output system into a power-saving mode, and is depressed again to return to normal from the power-saving mode. Further, the operating section 150 is comprised of function keys 611, 612, 613 for making the shift to an expanding function, copying function, and box function. FIG. 3 shows a state in which a standard screen of the copying function is displayed, and the depression of the other function keys 611 and 612 displays standard screens of the respective functions.

Further, the operating section 150 is comprised of an adjusting key 614 for adjusting the contrast of the LCD 600, and a counter confirmation key 615. The depression of the counter confirmation key 615 displays a count screen, which shows the total number of copies used up to the present, on the LCD 600. Further, the operating section 150 is comprised of an LED 616 for indicating that a job is being executed and images are being accumulated in the image accumulating section 160, an error LED 617 for indicating that a system error such as jamming or door opening has occurred, and a power LED 618 for indicating that a main switch of the image input/output system is on.

A description will now be given of trial copying according to the present embodiment.

Figure 4:
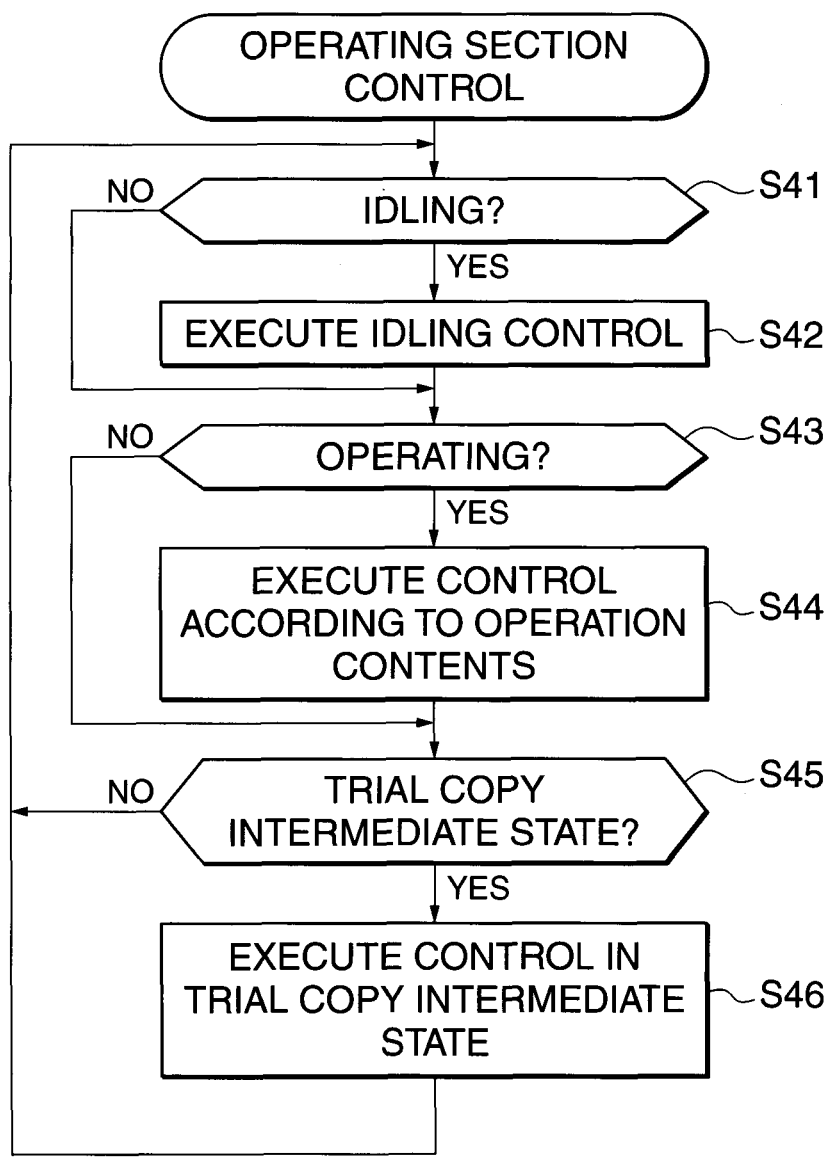
FIG. 4 is a flow chart showing a control task for the operating section 150 and an LCD 600 with a touch panel in FIG. 3.

Referring first to FIG. 4, a description will be given of how the operating section 150 and its LCD 600 with the touch panel are controlled. FIG. 4 is a flow chart showing a control task for controlling the operating section 150 and the touch panel LCD 600 in FIG. 3.

The control task for controlling the operating section 150 and the LCD 600 is started upon turning-on of power, and is constantly running. The control task is executed by the controller 110.

Referring to FIG. 4, in a step S41, it is determined first whether the image input/output system is idling or not. If the image input/output system is idling, it means that no job such as a copy job is being executed. If it is determined in the step S41 that the image input/output system is idling, the process proceeds to a step S42 wherein the operating section 150 and the LCD 600 are controlled with the image input/output system idling, and the process then proceeds to a step S43. If it is determined in the step S41 that the image input/output system is not idling, the process directly proceeds to the step S43 with the step S42 being skipped.

In the step S43, it is determined whether the image input/output system is operating or not. If copying is in progress, it is determined that the image input/output system is operating, and the process then proceeds to a step S44 wherein the operating section 150 and the LCD 600 are controlled according to the contents of the operation. The process then proceeds to a step S45. On the other hand, if it is determined in the step S43 that the image input/output system is not operating, the process directly proceeds to the step S45 with the step S44 being skipped.

In the step S45, it is determined whether the image input/output system lies in an intermediate state of trial copying or not. The intermediate state of trial copying means a state in which execution of a job is suspended after the completion of output of trial copies and the user is allowed to perform operations (for example, operations input through the LCD 600) during the suspension of the job. The details thereof will be described later. If it is determined in the step S45 that the image input/output system lies in the intermediate state of trial copying, the process proceeds to a step S46 wherein the operating section 150 and the LCD 600 are controlled in the intermediate state of trial copying. The process then returns to the step S41. On the other hand, if it is determined in the step S45 that the image input/output system does not lie in the intermediate state of trial copying, the process returns to the step S41.

Incidentally, although not illustrated in the drawings, corresponding individual processing is performed in an exceptional processing state such as a state in which the image input/output apparatus is suspended due to sheet exhaustion or a state in which jamming is handled, but description thereof is omitted.

Figure 5:
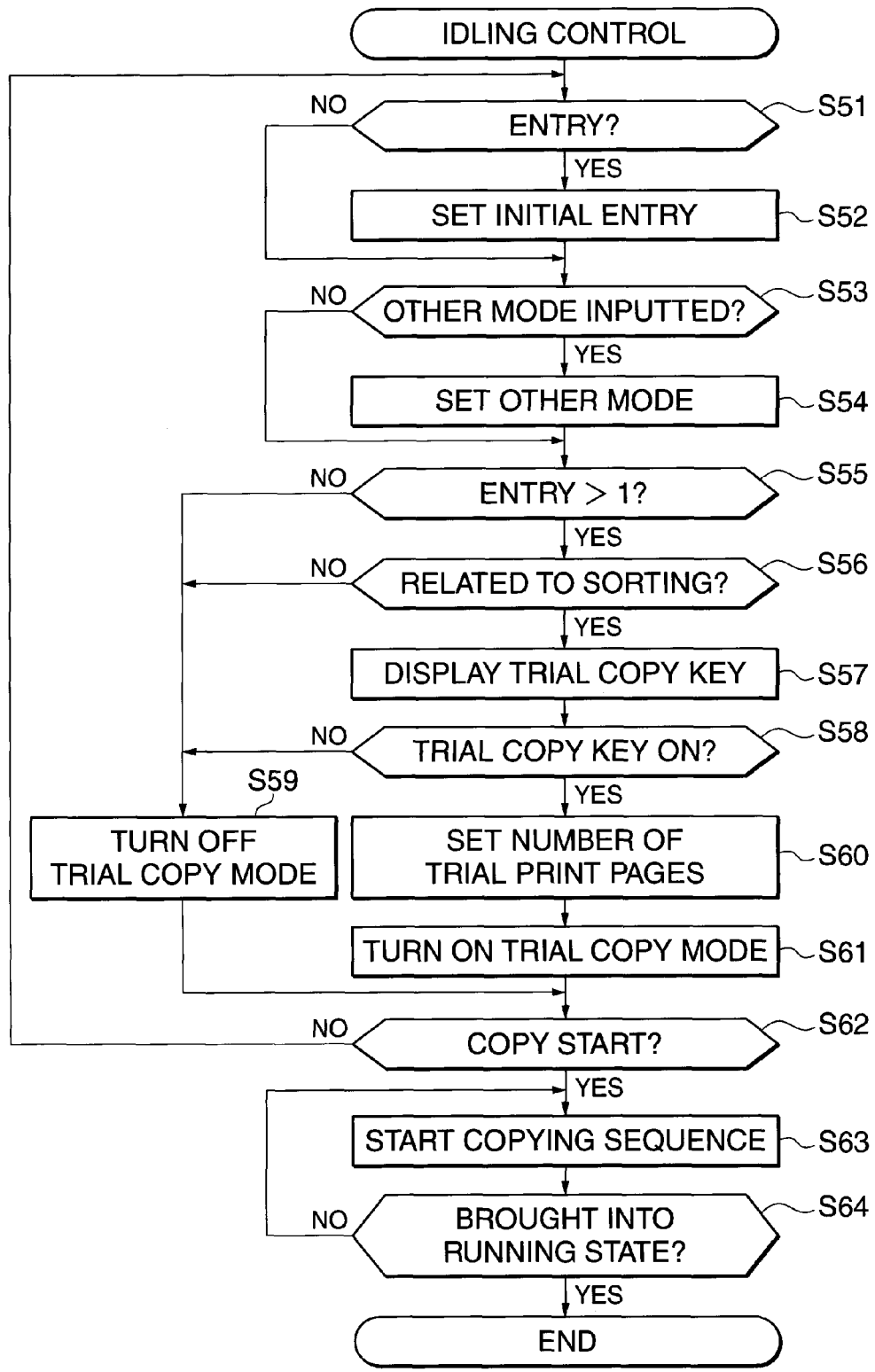
FIG. 5 is a flow chart showing the procedure for carrying out an idling control process in a step S42 in FIG. 4.
Figure 6:
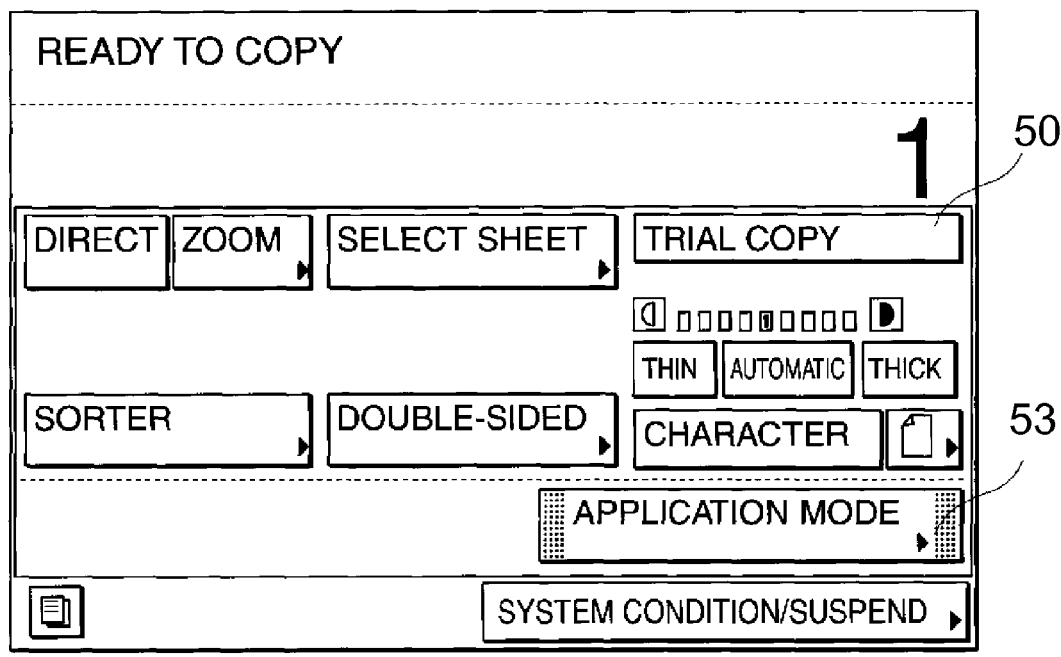
FIG. 6 is a view showing an example of a screen displayed on the LCD 600 of the operating section 150 in FIG. 3.
Figure 7:
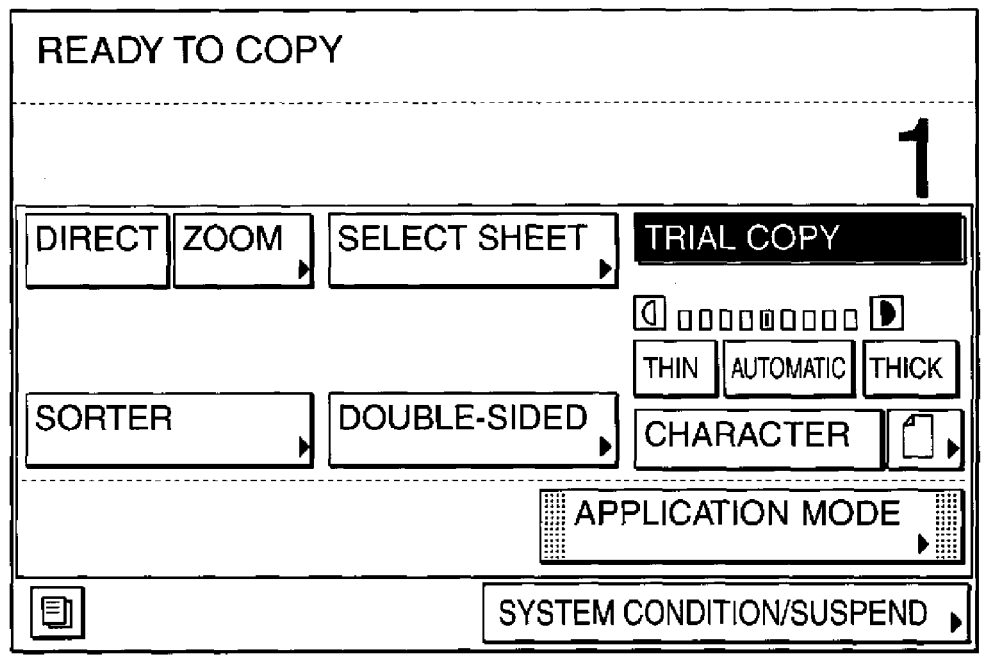
FIG. 7 is a view showing an example of a screen for setting the number of trial print pages, which is displayed in a step S60 in FIG. 5.
Figure 12:
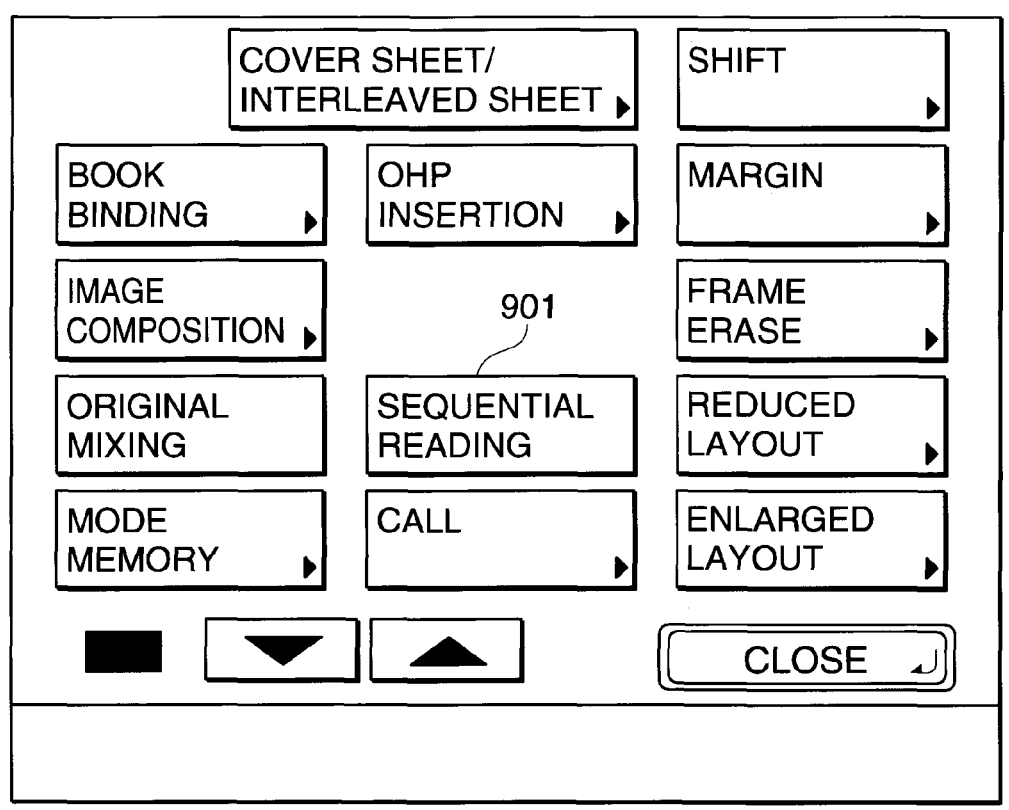
FIG. 12 is a view showing an example of an application mode setting screen displayed upon depression of an application mode key 503 on the screen in FIG. 6.

A description will now be given of idling control in the step S42 with reference to FIGS. 5, 6, 7, 9, and 12. FIG. 5 is a flow chart showing the procedure for providing idling control in the step S42 in FIG. 4, FIG. 6 shows an example of a screen displayed on the LCD 600 of the operating section 150 in FIG. 3 during idling, FIG. 7 shows an example of a screen for setting the number of trial print pages in a step S60 in FIG. 5, FIG. 9 shows an example of a state in which the trial copy key 50 is highlighted when a trial copy mode is on in a step S61 in FIG. 5, and FIG. 12 shows an example of an application mode setting screen displayed upon the depression of the application mode key 53 on the screen in FIG. 6. A description will now be given of control related to trial copying among controls executed for the operating section 150 during idling.

During idling, the screen in FIG. 6 is displayed on the LCD 600 of the operating section 150. During idling, the user can set a copy mode such as an entry mode, sheet selection mode, or sorting mode. The trial copy key 50 for setting the trial copy mode is displayed on the screen in FIG. 6. The trial copy key 50 is not displayed usually, but displayed according to settings of the copy mode. This will be described later.

During the idling control, first in a step S51, it is determined whether an entry has been made or not through the operation of a numeric keypad comprised of a key group 205. If it is determined in the step S51 that an entry has been made, the entry is set. The set entry is held insofar as it is not cleared or reset by the user. The process then proceeds to a step S53. On the other hand, if it is determined in the step S51 that no entry has been made, the process directly proceeds to the step S53 with the step S52 being skipped.

In the step S53, it is determined whether any mode other than the entry mode has been inputted or not. If it is determined in the step S53 that any mode other than the entry mode has been inputted, the inputted mode is set in a step S54, and the process then proceeds to a step S55. Examples of modes other than the entry mode are the sheet selection mode, sorter mode, double-sided printing mode, and so forth as shown in FIG. 6. Depressing the application mode key 53 on the screen in FIG. 6 displays a mode setting screen in FIG. 12 to enable setting of modes such as cover sheet/interleaved sheet mode, book-binding mode, original mixing mode, shift mode, frame erasing mode, which are ordinarily used for digital copying machines. These modes are known, and description thereof is omitted. On the other hand, if it is determined in the step S53 that no mode other than the entry mode has been inputted, the process directly proceeds to the step S55 with the step S54 being skipped.

In the step S55, it is determined whether the entry is greater than 1 or not. If it is determined in the step S55 that the entry is greater than 1, the process proceeds to a step S56 wherein any mode related to sorting has been set or not. If it is determined in the step S56 that any mode related to sorting has been set, the trial copy key 50 is displayed as is the case with the screen in FIG. 6. If any mode unrelated to sorting has been set or the entry is equal to 1, the trial copy key 50 is not displayed since it is meaningless to carry out trial copying. Then, it is determined in a step S58 whether the trial copy key 50 has been turned on or not.

If it is determined in the step S58 that the trial copy key 50 has been turned on, the number of trial print pages is set in the step S60. Specifically, upon turning-on of the trial copy key 50, the screen changes over from the screen in FIG. 6 to a screen in FIG. 9 on which it is determined whether the number of trial print pages is to be automatically set or manually set, or all pages are to be subjected to trial printing. If it is determined that the number of trial print pages is to be manually set, the number of trial print pages is set using the numerical keypad to display the set number in a set number box 51. Upon depression of an OK key 52, the screen in FIG. 9 is closed so that the screen changes over to the screen in FIG. 6. At the same time, in the step S61, the trial copy mode is turned on. On this occasion, the trial copy key 50 is highlighted in black as shown in FIG. 7. The process then proceeds to a step S62.

If it is determined in the step S58 that the trial copy key 50 has been turned on, if it is determined in the step S55 that the entry is 1, or if it is determined in the step S56 that any mode related to sorting has not been set, the process proceeds to a step S59 wherein the trial copy mode is turned off. The process then proceeds to the step S62.

In the step S62, it is determined whether the start key 607 has been depressed or not. If it is determined in the step S62 that the start key 607 has not been depressed, the process returns to the step S51 to repeat the processing during idling. On the other hand, if it is determined in the step S62 that the start key 607 has been depressed, the process proceeds to a step S63 wherein a copying sequence is started. On this occasion, data such as the entry, the set copy mode, and other mode settings are transferred from the operating section control task to a copying sequence task.

In the next step S64, it is determined whether the copying sequence has been brought into a running state or not, and if the determination result is positive, the idling control is brought to an end.

Figure 8A:
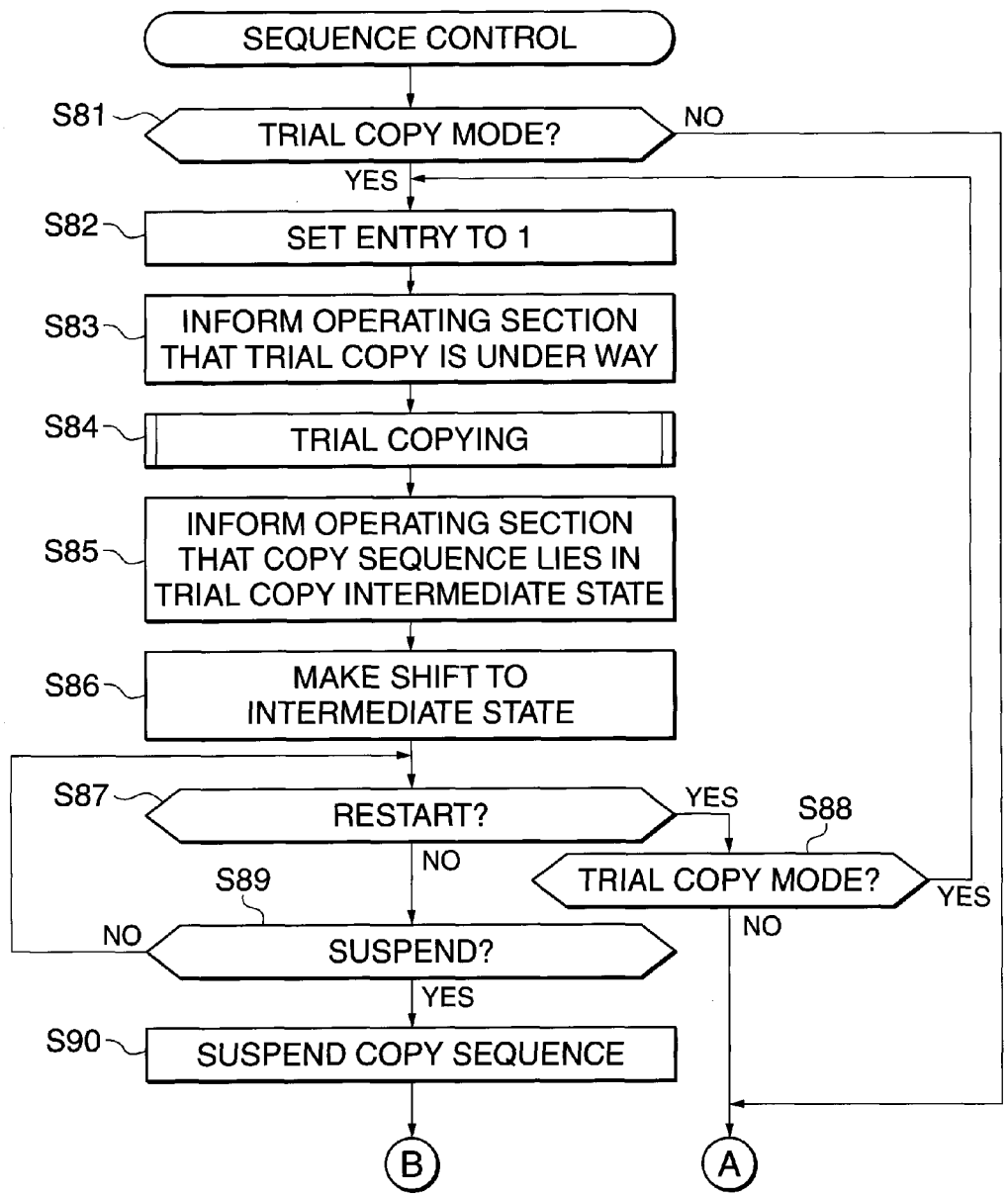
FIGS. 8A-8B are flow chart showing a copying sequence in a step S63 in FIG. 5.
Figure 8B:
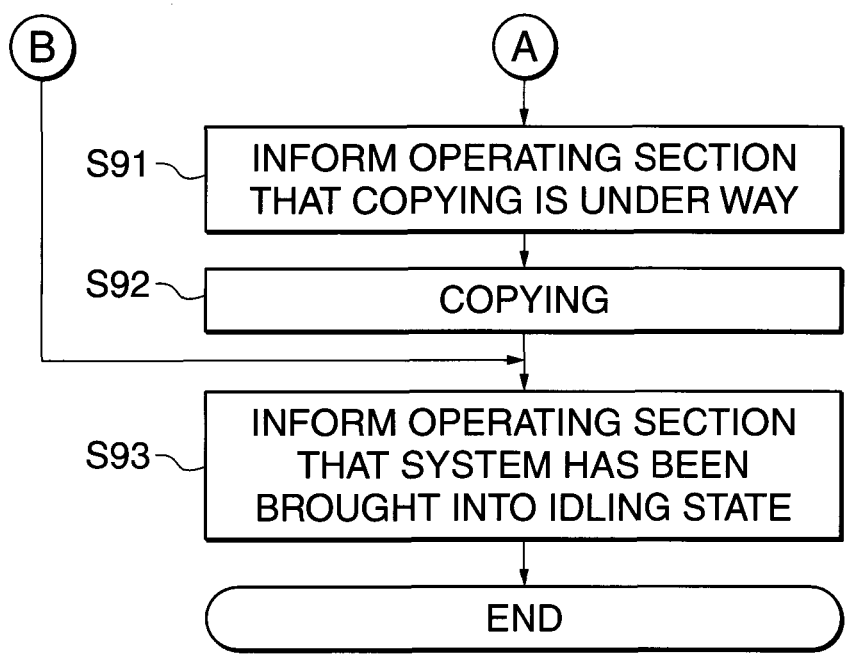
Figure 10:
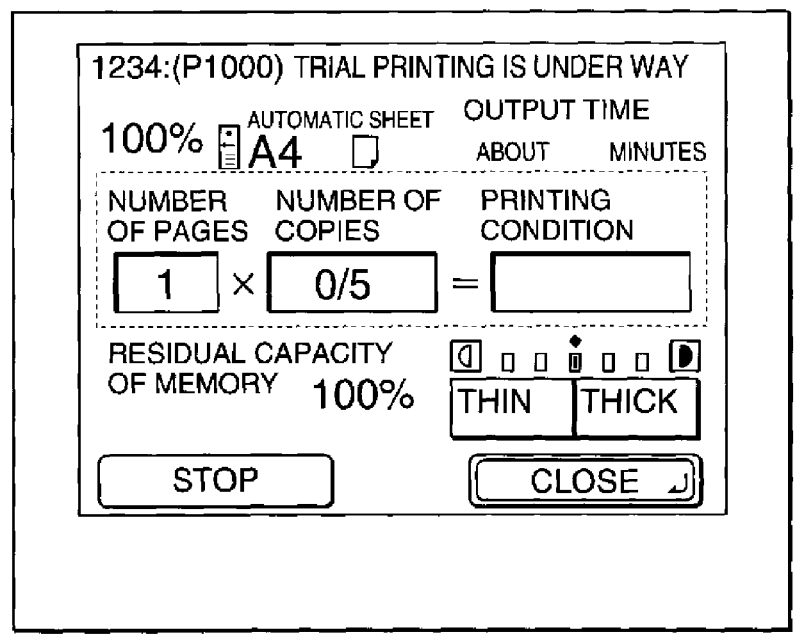
FIG. 10 is a view showing an example of a screen displayed on the LCD 600 of the operating section 150 in FIG. 3 during trial copying.
Figure 11:
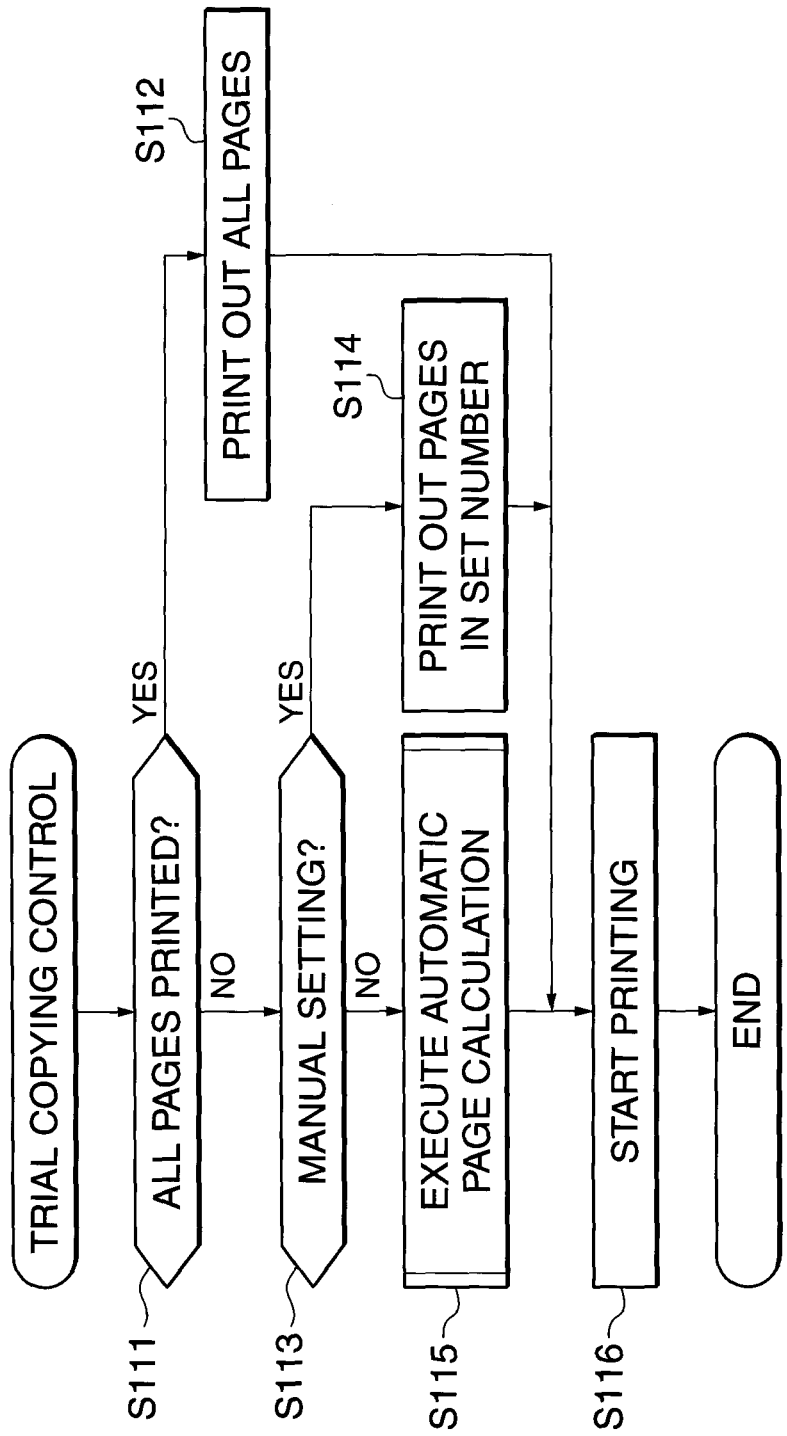
FIG. 11 is a flow chart showing the procedure for carrying out a trial copying process in a step S84 in FIGS. 8A-8B.
Figure 13A:
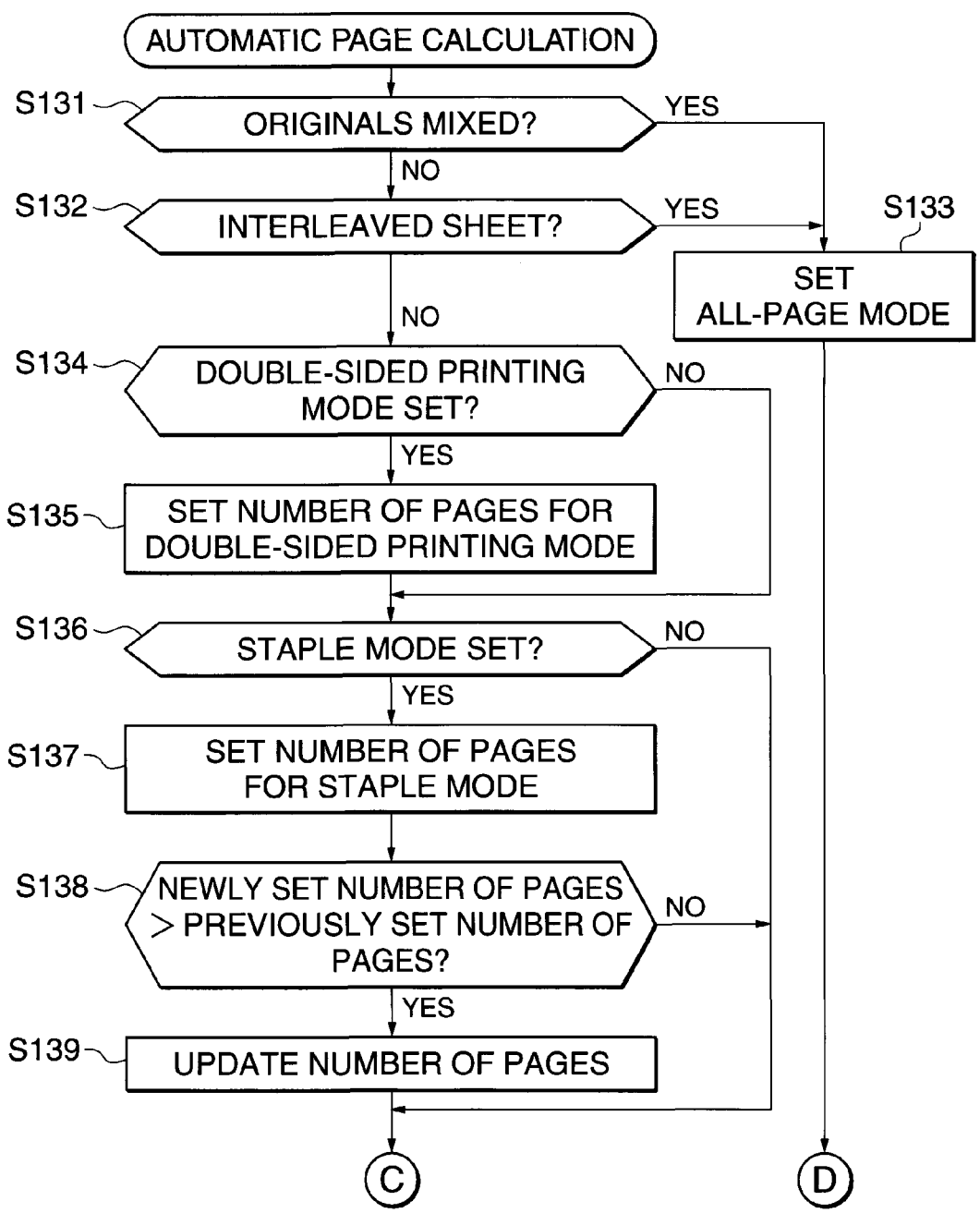
FIGS. 13A-13B are flow chart showing the procedure for carrying out an automatic page calculating process in a step S115 in FIG. 11.
Figure 13B:
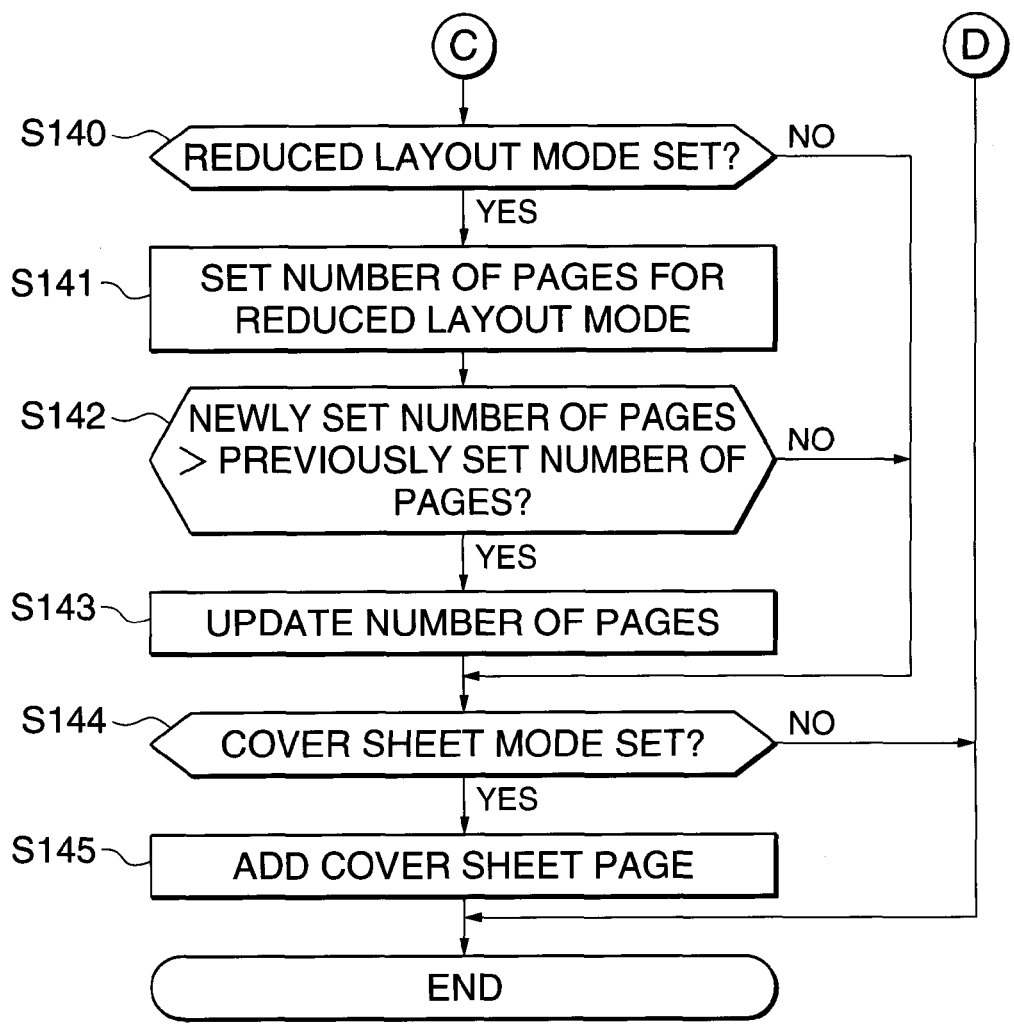
Figure 17:
FIG. 17 is a view schematically showing the reason for setting the number of trial print pages in a staple mode during the automatic page calculation.
Figure 18:
FIG. 18 is a view schematically showing the reason for setting the number of trial print pages in a reduced layout mode during the automatic page calculation.
Figure 19A:
FIG. 19A is a view showing an example of output in a cover sheet mode.
Figure 19B:
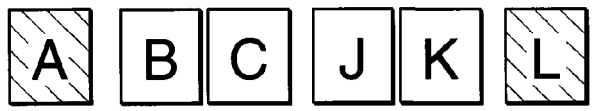
FIG. 19B is a view showing an example of a result obtained by trial copying in the double-sided printing mode with the cover sheet mode being set.
Figure 19C:
FIG. 19C is a view showing an example of a result obtained by trial copying in a staple mode with the cover sheet mode being set.
Figure 19D:
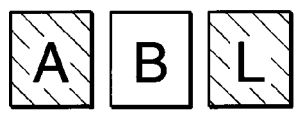
FIG. 19D is a view showing an example of a result obtained by trial copying with the cover sheet mode being set.
Figure 20:
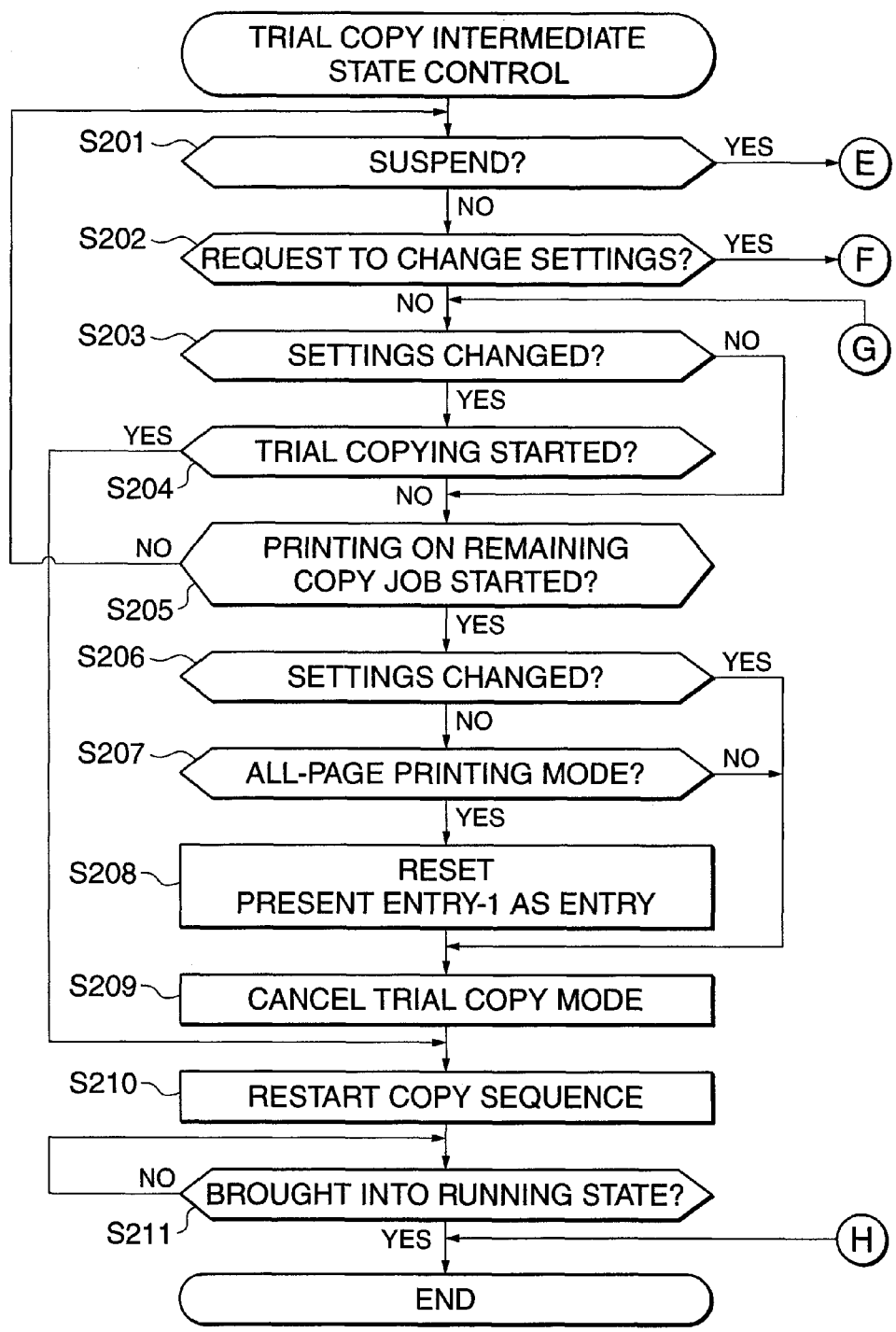
FIG. 20 is a flow chart showing the procedure for providing control in an intermediate state of trial copying in a step S46 in FIG. 4.
Figure 21:
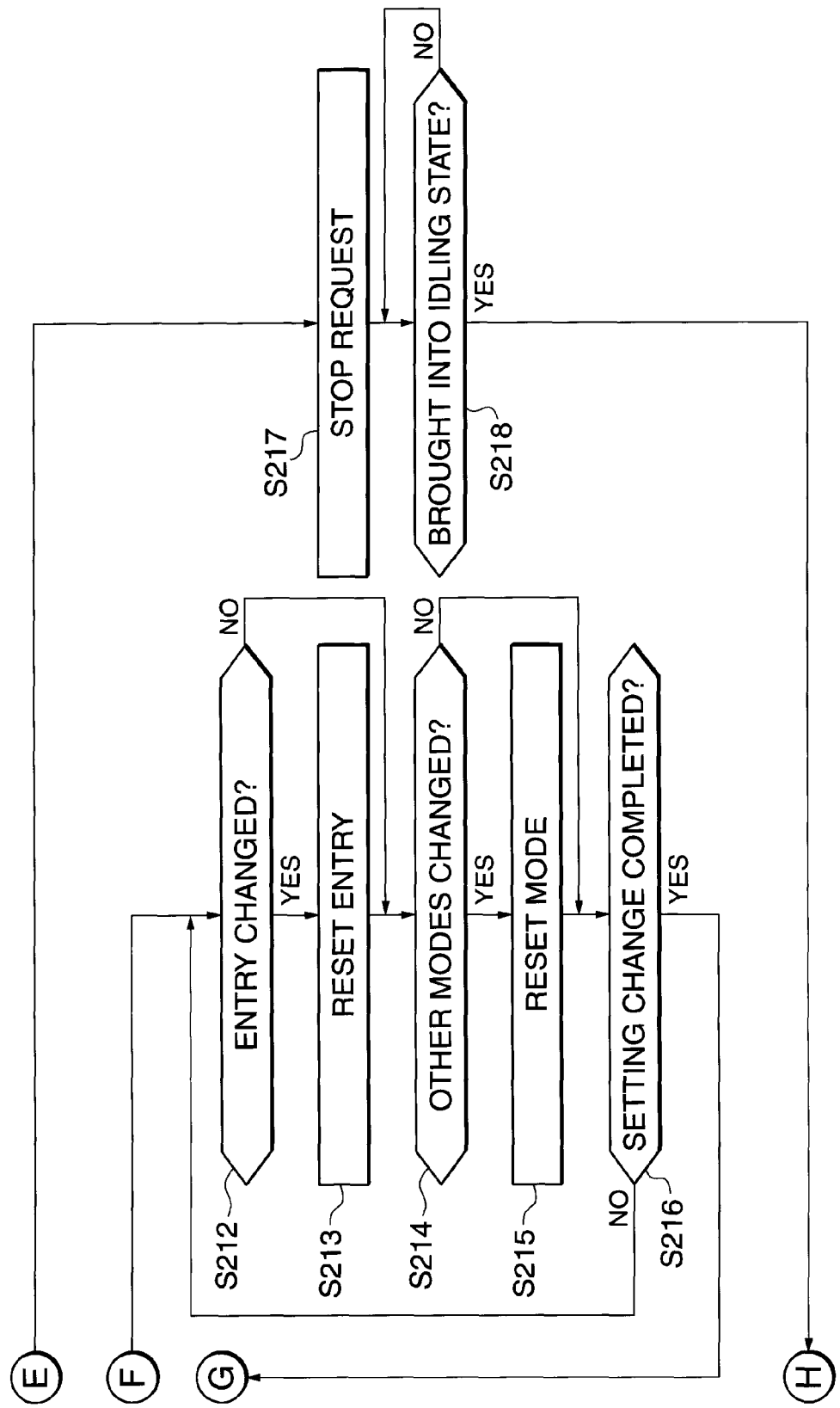
FIG. 21 is a flow chart showing a continued part of the procedure in FIG. 4.
Figure 22:
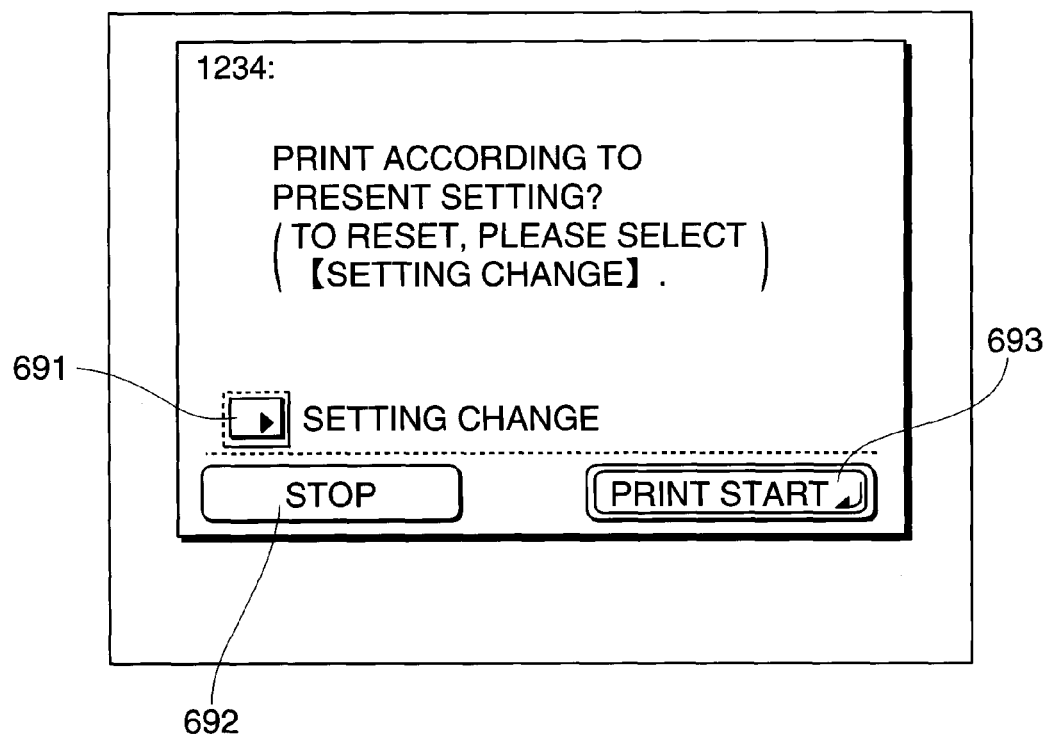
FIG. 22 is a view showing an example of a screen displayed during the control in the intermediate state of trial copying in the step S46 in FIG. 4.
Figure 23:
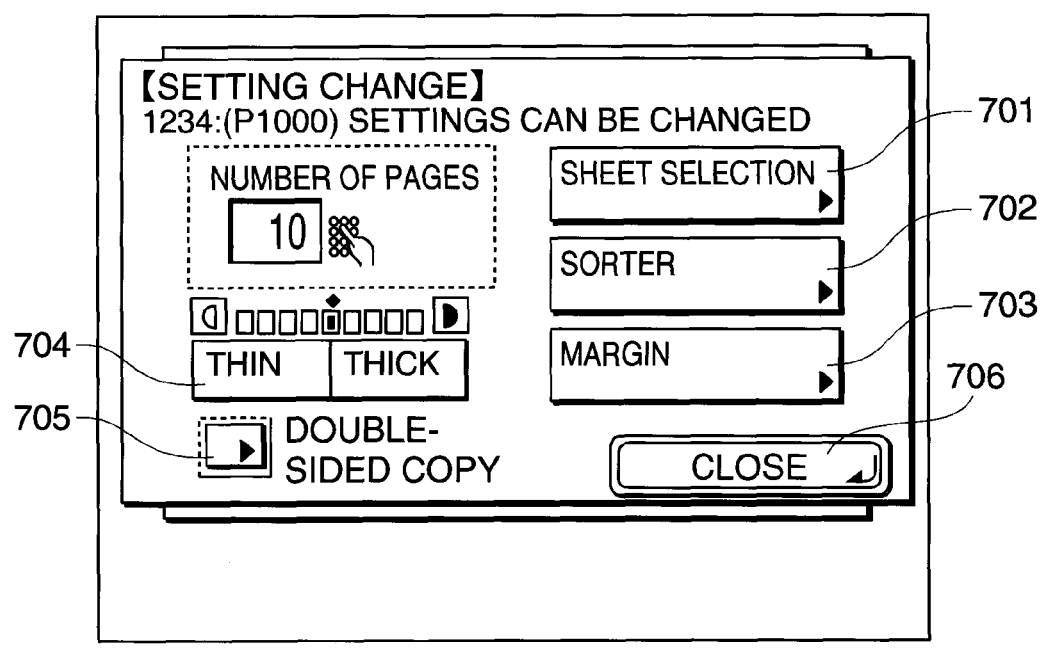
FIG. 23 is a view showing an example of a resetting screen displayed when it is determined in a step S202 in FIG. 20 that a request to change settings has been issued.
Figure 24:
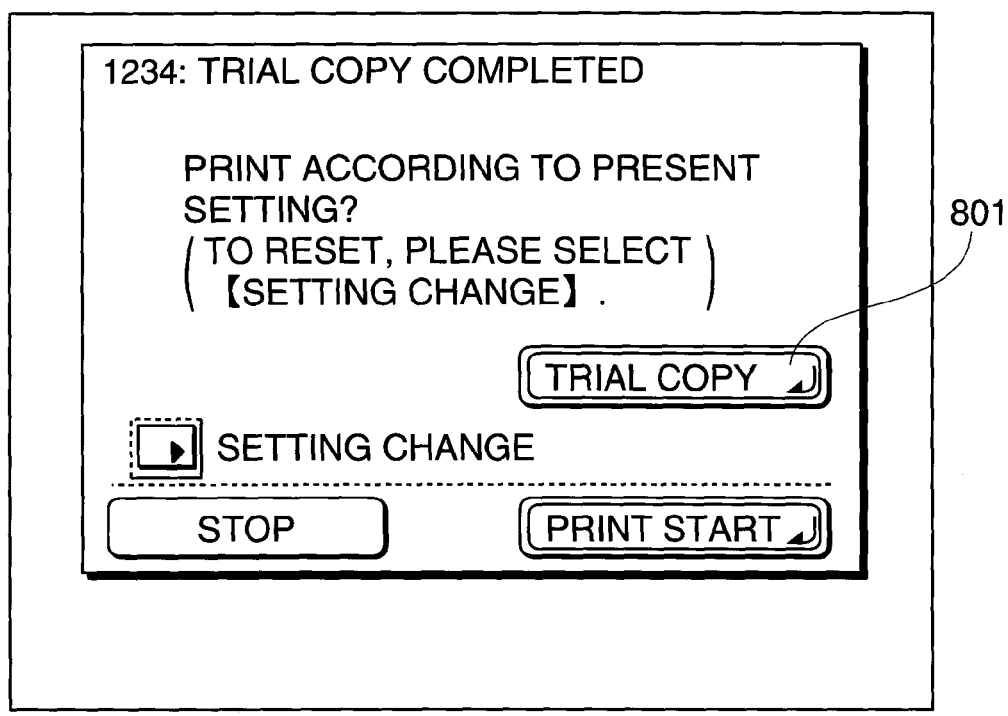
FIG. 24 is a view showing an example of a screen displayed when it is determined in a step S203 in FIG. 20 that settings are to be changed.

A description will now be given of the copying sequence with reference to FIGS. 8A, 8B, 10, 11, and 13A-24. FIGS. 8A-8B are flow chart showing the copying sequence in the step S63, FIG. 10 shows an example of a screen displayed on the LCD 600 of the operating section 150 in FIG. 3 during trial copying, FIG. 11 is a flow chart showing the procedure for carrying out a trial copying process in a step S84, FIGS. 13A-13B are flow chart showing the procedure for carrying out an automatic page calculating process in a step S115 in FIG. 11, FIG. 14 schematically shows an example where an interleaved sheet is inserted between output sheets in the interleaved sheet mode, FIG. 15A shows an example of an original read in the double-sided printing mode, FIG. 15B shows an example of trial copying in a horizontal spread double-sided printing mode, FIG. 15C shows an example of trial copying in a vertical spread double-sided printing mode, FIG. 16 shows an example of a screen for presetting the number of set pages for automatic page calculation during trial copying, FIG. 17 schematically shows the reason for setting the number of trial print pages in the staple mode during automatic page calculation, FIG. 18 schematically shows the reason for setting the number of trial print pages in a reduced layout mode during the automatic page calculation, FIG. 19A shows an example of output in the cover sheet mode, FIG. 19B shows an example of a result obtained by trial copying in the double-sided printing mode with the cover sheet mode being set, FIG. 19C shows an example of a result obtained by trial copying in the staple mode with the cover sheet mode being set, FIG. 19D shows an example of a result obtained by trial copying with the cover sheet mode being set, FIG. 20 is a flow chart showing the procedure for providing control in the intermediate state of trial copying in the step S46 in FIG. 4, FIG. 21 is a flow chart showing the procedure for providing control in the intermediate state of trial copying in the step S46 in FIG. 4, FIG. 22 is a flow chart showing the procedure for providing control in the intermediate state of trial copying in the step S46 in FIG. 4, FIG. 23 shows an example of a resetting screen displayed when it is determined in a step S202 in FIG. 20 that a request to change settings has been issued, and FIG. 24 shows an example of a screen displayed when it is determined in a step S203 that settings are to be changed.

Upon the start of the copy sequence, as shown in FIGS. 8A-8B, it is determined first in a step S81 whether the copy mode has been set or not. If it is determined in the step S81 that the copy mode has been set, the process proceeds to a step S82 wherein the entry is set to 1. The entry set on this occasion is a provisional entry that is different from the entry set by the user and is used for internal processing. In the trial copy mode, the entry is set so as to make the shift to the intermediate state of trial copying once after partial printing.

In the next step S83, the operating section control task is notified that trial copying has been started. In response to this notification, the operating section control task starts processing in the step S44 (FIG. 4) to provide control to make the shift to a screen in FIG. 10. A message indicative of the fact that trial printing is under way or the like is displayed on the screen in FIG. 10. In the next step S84, the trial copying process is started. In the step S84, an original is read to perform printing of one copy while image data thereof is accumulated in the image memory 120.

The trial copying process is carried out according to the number of trial print pages set in the step S60. Specifically, as shown in FIG. 11, it is determined in a step S111 whether all the pages are to be subjected to trial printing or not. If it is determined in the step S111 that all the pages are to be subjected to trial printing, the process proceeds to a step S112 wherein a setting is made such that all of the read pages are to be printed. The process then proceeds to a step S116. On the other hand, if it is determined in the step S111 that all the pages are not to be subjected to trial printing, the process proceeds to a step S113 wherein it is determined whether the number of trial print pages has been manually set or not. If it is determined in the step S113 that the number of trial print pages has been manually set, the process proceeds to a step S114 wherein a setting is made such that trial printing is to be carried out on the manually set number of pages. Then, the process proceeds to the step S116.

If it is determined in the step S113 that the number of trial print pages has not been manually set, the process proceeds to a step S115 wherein the automatic page calculating process is carried out.

Specifically, in the automatic page calculating process, as shown in FIGS. 13A-13B, it is determined first in a step S131 whether the original mixing mode has been set or not. If it is determined in the step S131 that the original mixing mode has been set, it is necessary to print all the pages to check the finish of printing, and thus the process proceeds to a step S133 wherein a setting is made such that all the pages are to be printed. The process is then terminated. On the other hand, if it is determined in the step S131 that the original mixing mode has been not set, the process proceeds to a step S132 wherein it is determined whether the interleaved sheet mode has been set or not. The interleaved sheet mode is a mode where an interleaved sheet is inserted between arbitrary pages selected from output pages A to G, for example. If it is determined in the step S132 that the interleaved sheet mode has been set, it is necessary to print all the pages to check the finish of printing as in the original mixing mode, and the process proceeds to the step S133 wherein a setting is made such that all the pages are to be printed.

If it is determined in the step S132 that the interleaved sheet mode has not been set, the process proceeds to a step S134 wherein it is determined whether the double-sided printing mode has been set or not. If it is determined in the step S134 that the double-sided printing mode has been set, the number of sheets to be subjected to double-sided printing is set in a step S135, and the process then proceeds to a step S136. It is assumed here that an original consisting of pages A to L as shown in FIG. 15A is subjected to double-sided printing. The double-sided printing mode includes a horizontal spread double-sided printing mode where a desired double-sided printing result is obtained when the left ends of sheets are stapled as shown in FIG. 15B, and a vertical spread double-sided printing mode where a desired double-sided printing result is obtained when the upper ends of sheets are stapled as shown in FIG. 15C. The finish of total printing can be satisfactorily estimated by printing two sheets in either mode, and hence, it is determined that two sheets are to be subjected to trial printing in the double-sided printing mode.

Incidentally, in the present embodiment, the number of sheets set for the double-sided printing mode is preset in a preset mode such that it may be changed. The preset mode is set on a user mode setting screen which is displayed by depressing the user mode key 605 provided on the operating section in FIG. 3. For example, a screen for presetting the number of pages in the automatic page calculation during trial copying is displayed as shown in FIG. 16. On this screen, it is possible to variably set the number of print pages in the double-sided printing mode, staple mode, or reduced layout mode. Each key on the screen in FIG. 16 is highlighted when depressed, so that a value inputted through the numerical keypad is set as the number of print pages in the corresponding mode. On the screen in FIG. 16, a default value is set for a section "others" in the case where no special mode is set.

If it is determined in the step S134 that the double-sided printing mode has not been set, the process directly proceeds to the step S136 with the step S135 being skipped.

In the step S136, it is determined whether the staple mode has been set or not. If it is determined in the step S136 that the staple mode has been set, the number of sheets to be subjected to processing in the staple mode is set in a step S137. In the staple mode, printing and stapling two sheets as shown in FIG. 17 suffices to check the finish of stapling such as staple positions, and hence the number of trial print pages is set to 2.

It is then determined in a step S138 whether the newly set number of pages (the number of print pages set in the step S137) is greater than the previously set number of pages (the number of print pages set in the step S135) or not. Assuming here that both the double-sided printing mode and the staple mode are set, the number of trial print pages set for the double-sided printing mode in the step S135 and the number of trial print pages set for the staple mode in the step S137 are compared with each other. If it is determined in the S138 that the newly set number of pages (print pages) is greater than the previously set number of pages (print pages), the process proceeds to a step S139 wherein the number of trial print pages is updated to the value set in the step S137. The process then proceeds to a step S140. If it is determined in the S138 that the newly set number of pages (print pages) is not greater than the previously set number of pages (print pages), the process directly proceeds to the step s140 with the step S139 being skipped. Specifically, the number of trial print pages is not updated to the value set in the step S137, but is held at the value set in the step S135.

In the step S140, it is determined whether the reduced layout mode has been set or not. If it is determined in the step S140 that the reduced layout mode has not been set, the number of pages to be subjected to reduced layout is set in a step S141. The reduced layout mode is a mode where a plurality of originals are laid out and outputted on one sheet surface. In this case, the number of print pages is set to 1 since the layout can be recognized by referring to one output sheet. In the next step S142, it is determined whether the newly set number of pages (the number of print pages set in the step 141) is greater than the previously set number of pages (the number of print pages set in the step S135 or S137). Assuming here that any two modes among the double-sided printing mode, staple mode, and reduced layout mode are set, the number of pages set in the step S135 or S137 and the number of pages set for the reduced layout mode in the step S141 are compared with each other. If it is determined in the S142 that the newly set number of pages (print pages) is greater than the previously set number of pages (print pages), the process proceeds to a step S143 wherein the number of trial print pages is updated to the value set in the step S141. The process then proceeds to a step S144. If it is determined in the S142 that the newly set number of pages (print pages) is not greater than the previously set number of pages (print pages), the process directly proceeds to the step S144 with the step S143 being skipped. Specifically, the number of trial print pages is not updated to the value set in the step S141, but is held at the value set in the step S135 or S137.

In the step S144, it is determined that the cover sheet mode has been set or not. If it is determined in the step S144 that the cover sheet mode has not been set, the process is terminated. On the other hand, if it is determined in the step S144 that the cover sheet mode has been set, coversheet pages are added in a step S145. The coversheet mode is a mode where a cover sheet A and a back cover sheet L are added to the leading end and tailing end, respectively, of sheets B to G on which images are printed as shown in FIG. 19A. In the cover sheet mode, it is impossible to confirm the finish of printing if no coversheet or back cover sheet is added, and hence, the number of trial print pages is determined with the number of additional pages of a cover sheet and a back cover sheet being taken into account. For example, if a cover sheet and a back cover sheet are added in the double-sided printing mode, the number of cover sheets and back cover sheets is added to two as the designated number of pages in the double-sided printing mode, and the number of print pages is determined such that the trial copying result as shown in FIG. 19B can be obtained. In the case of the staple mode, the number of print pages is determined such that the trial copying result as shown in FIG. 19C can be obtained, and if no particular mode has been designated, the number of print pages is determined such that the trial copying result as shown in FIG. 19D can be obtained.

After the number of trial print pages is determined by carrying out the automatic page calculating process described above, one copy consisting of the set number of print pages is printed in the step S116 (FIG. 11). The process is then terminated.

Upon completion of the trial copying process (the step S84 in FIGS. 8A-8B) carried out in the above described sequence, the process proceeds to a step S85 where the operating section control task is notified of the process proceeding to the intermediate state of trial copying. Thereafter, in a step S86, the process proceeds to the intermediate state of trial copying. Information indicative of this fact is transmitted to the operating section control task, and as a result, control is executed in the intermediate state of trial copying in the step S46 (FIG. 4) of the operating section control task.

During the execution of control in the intermediate state of trial copying, a screen in FIG. 22 is displayed which includes a setting changing key 691, a suspension key 692, and a printing start key 693.

To execute control in the intermediate state of trial copying, it is determined in a step S201 in FIG. 20 whether the suspension key 692 has been depressed or not. If it is determined in the step S201 that the suspension key 692 has been depressed, a suspending request is issued to the copying sequence task in a step S217 in FIG. 21, and in the next step S218, the process waits for the copying sequence to shift to an idling state. Upon the copying sequence shifting to the idling state, the process is terminated.

If it is determined in the step S201 that the suspension key 692 has not been depressed, it is then determined in a step S202 whether the setting changing key 691 has been depressed or not, i.e. whether a setting changing request has been issued or not. If it is determined in the step S202 that the setting changing request has been issued, the operating section 150 switches to a resetting screen in FIG. 23. A sheet selection key 701, a sort setting key 702, a stapling margin setting key 703, a density setting key 704, and a double-sided copy setting key 705 as well as an entry box are displayed on the resetting screen in FIG. 23 so that settings other than the entry can be changed.

In the next step S212, it is determined whether the entry has been changed by depressing a key of the numeric keypad 601 provided in the operating section 150. If it is determined in the step S212 that the entry has been changed, the set entry is reset to the changed entry. The process then proceeds to a step S214. On the other hand, if it is determined in the step S212 that the entry has not been changed, the process directly proceeds to the step S214 with the step S213 being skipped.

In the step S214, it is determined whether any of modes, which are allowed to be changed on the resetting screen, has been changed or not. If it is determined in the step S214 that any mode has been changed, the mode is updated in a step S215, and the process proceeds to a step S216. On the other hand, if it is determined in the step S214 that any mode has not been changed, the directly process proceeds to the step S216 with the step S215 being skipped. In the step S216, it is determined whether a close key 706 has been depressed on the resetting screen in FIG. 23 or not. If it is determined in the step S216 that the close key 706 has been depressed, it is determined that the user has finished changing settings, and the process then proceeds to a step S203. On the other hand, if it is determined in the step S216 that the close key 706 has not been depressed, the process returns to the step S212.

In the step S203, it is determined whether settings have been changed in the steps S212 through S215. If it is determined in the step S203 that settings have been changed, a trial copy key 801 is displayed on the screen in FIG. 22 as shown in FIG. 24. Depressing the trial copy key 801 enables the user to carry out trial copying again according to the mode whose settings have been changed. Accordingly, it is determined in a step S204 whether the trial copy key 801 has not been depressed, it is then determined in a step S205 whether the printing start key 693 has been depressed or not. Depressing the printing start key 693 enables the user to make copies in a number, which has been changed, according to the previously set mode or the reset mode, and then the copy job is terminated. If it is determined in the step S205 that the printing start key 693 has not been depressed, the process returns to the step S201. On the other hand, if it is determined in the step S205 that the printing start key 693 has been depressed, it is then determined in a step S206 whether settings have been changed in the intermediate state or not.

If it is determined in the step S206 that settings has not been changed, it is then determined in a step S207 whether all pages have been outputted by trial copying or not. If it is determined in the step S207 that all the pages have been outputted by trial copying, the process proceeds to a step S208 wherein all the pages outputted by trial copying are regarded as a part of an effective copy, and the difference obtained by subtracting 1 from the set entry is set as a new entry. The process then proceeds to a step S209. On the other hand, if it is determined in the step S206 that settings have been changed, or if it is determined in the step S207 that all the pages have not been outputted by trial copying, the process proceeds to the step S209 without changing the set entry (with the step S208 being skipped).

In the step S209, the trial copy mode is canceled, and in the next step S210, a restart request is given to the copying sequence task. It is then determined in a step S211 whether the copying sequence has started to run or not, and when the determination result is positive, the process is terminated.

If it is determined in the step S204 that the trial copy key 801 has not been depressed, the process proceeds to the step S210 wherein the restart request is given to the copying sequence task. On this occasion, the mode changed from the set mode and data relating to the other modes set first are transferred from the operating section control task to the copying sequence task.

Referring again to FIGS. 8A-8B, a description will now be given of the operation of the copying sequence task after the copying sequence is brought into the intermediate state of trial copying. After the copying sequence shifts to the intermediate state, it is determined in a step S87 whether the restart request has been given from the operating section control task or not. If it is determined in the step S87 that the restart request has not been given, it is then determined in a step S89 whether a stop request has been given or not. If it is determined in the step S89 that the stop request has not been given, the process returns to the step S87. On the other hand, if it is determined in the step S89 that the stop request has been given, the copying sequence lying in the intermediate state is stopped in a step S90, and the process proceeds to a step S93 wherein the operating section control task is informed that the copying has been brought to an end and the system has been returned to the idling state. The process is then terminated.

If it is determined in the step S87 that the restart request has been given, it is determined in a step S88 whether the trial copy mode has been set or not. If it is determined in the step S88 that the trial copy mode has been set, the process returns to the step S82. On the other hand, if it is determined in the step S88 that the trial copy mode has not been set, the process proceeds to a step S91 wherein the operating section control task is informed that copy-printing has been started, and the process then proceeds to a step S92 wherein copy-printing is started according to the mode and entry data set at the restart. In the next step S93, the operating section control task is informed that the copying has been brought to an end and the system has been returned to the idling state.

Incidentally, when trial copy printing is carried out again in the intermediate state, or when copy-printing is carried out with the trial copy mode being canceled, image data accumulated in the image accumulating section 160 is read out first, without an original being read, and processing is performed on the readout image data according to the set mode so that the image data can be printed.

The trial copying is carried out as described below under the above described control.

First, if the trial copy mode has been set, the copying sequence shifts to the intermediate state which permits resetting after partial printing. On this occasion, a part of the copy or all pages of the copy are printed according to the set mode as described above. As a result, the user can obtain the trial copying result within a short period of time and without wasting supplies as compared with the case where all the pages are always printed out.

In the case where trial copying is carried out again in the intermediate state, as is distinct from the above case, the entry is processed as described below in printing started upon depression of the printing start key 693, i.e., copy-printing with the trial copy mode being canceled.

First, if the mode has been changed in the intermediate state, printing is performed to print out pages in a number corresponding to the entry set in advance. This is based on the assumption that the printing result desired by the user is obtained after the change in mode, and does not take the trial copying result obtained before then into account.

If the mode has not been changed in the intermediate state, it can be assumed that the user accepts the trial copying result obtained before, and intends to continue printing. In this case, the trial copying result obtained before is regarded as being valid, and the entry is decreased by a value corresponding to the trial copying result and the remaining copy print job is executed, so that copies in a number required by the user can be printed out (this corresponds to the "all-page" mode in the above described example, and the example (2) among the above described examples (1) through (6) corresponds to this).

However, in the case of the mode in which only a part of all the pages is printed out in trial copying (this corresponds to a non all-page mode, such as the "manual" mode and the "automatic" mode, other than the "all-page" mode, in the above described examples), this part may not regarded as an effective print part, and hence the above described entry subtraction is not performed (for example, this corresponds to the examples (4) and (6) among the above described examples (1) through (6)).

Further, during trial printing in the trial copy mode, one copy is always printed out, but the entry set first remains unchanged. This is particularly effective because copies in a number desired by the user, which corresponds to the entry, can be printed out without causing the user to change the entry when changing the mode in the case where the user carries out trial copying.

Figure 25:
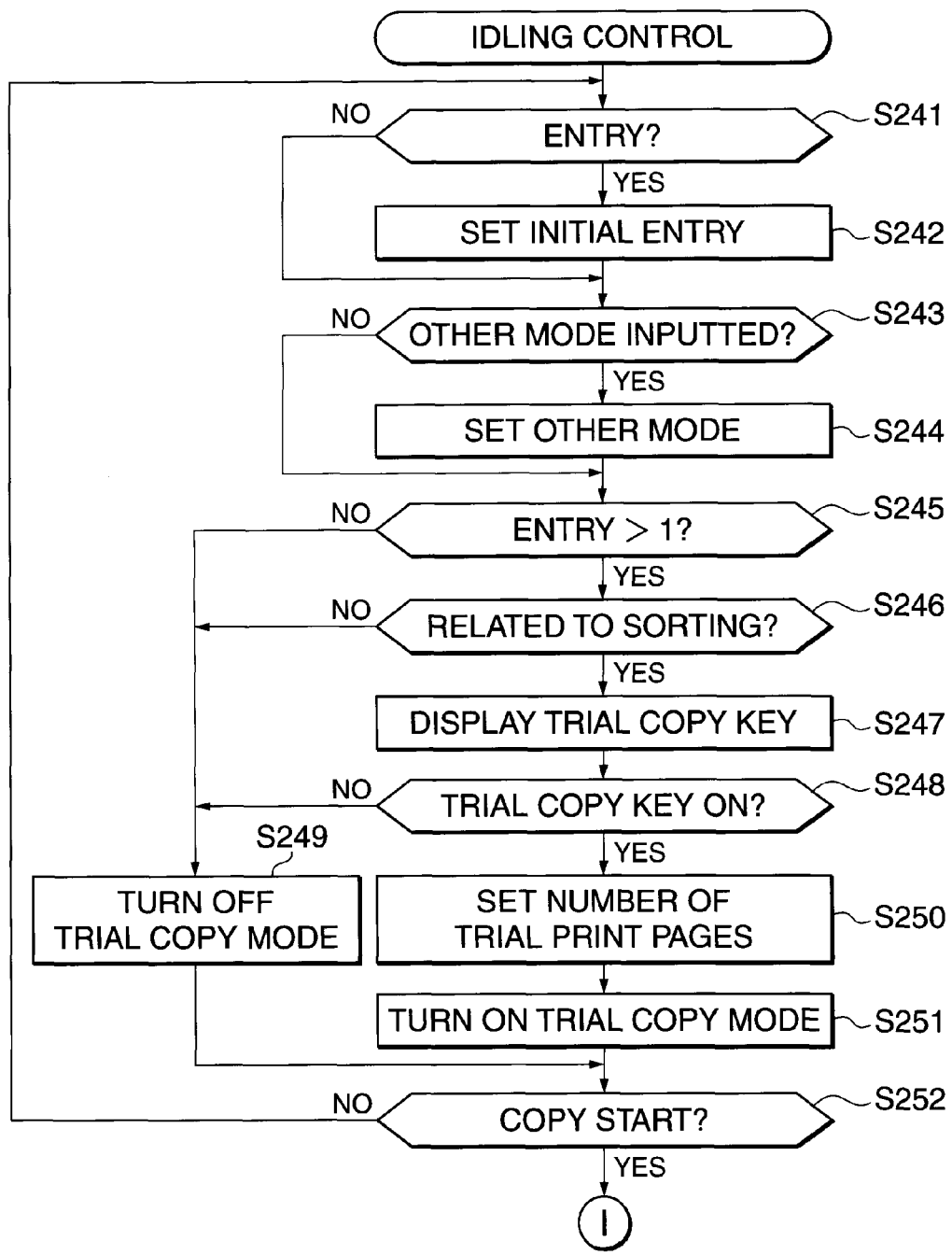
FIG. 25 is a flow chart showing the procedure for providing idling control in an image input/output system according to a second embodiment of the present invention.
Figure 26:
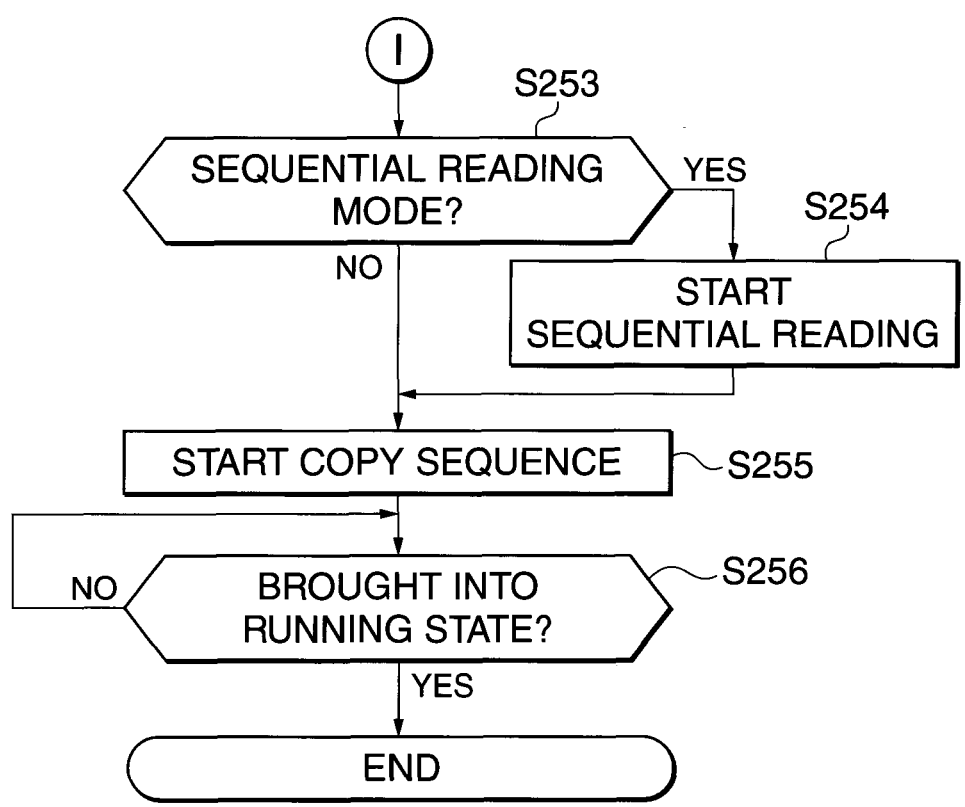
FIG. 26 is a flow chart showing a continued part of the procedure in FIG. 25.
Figure 27A:
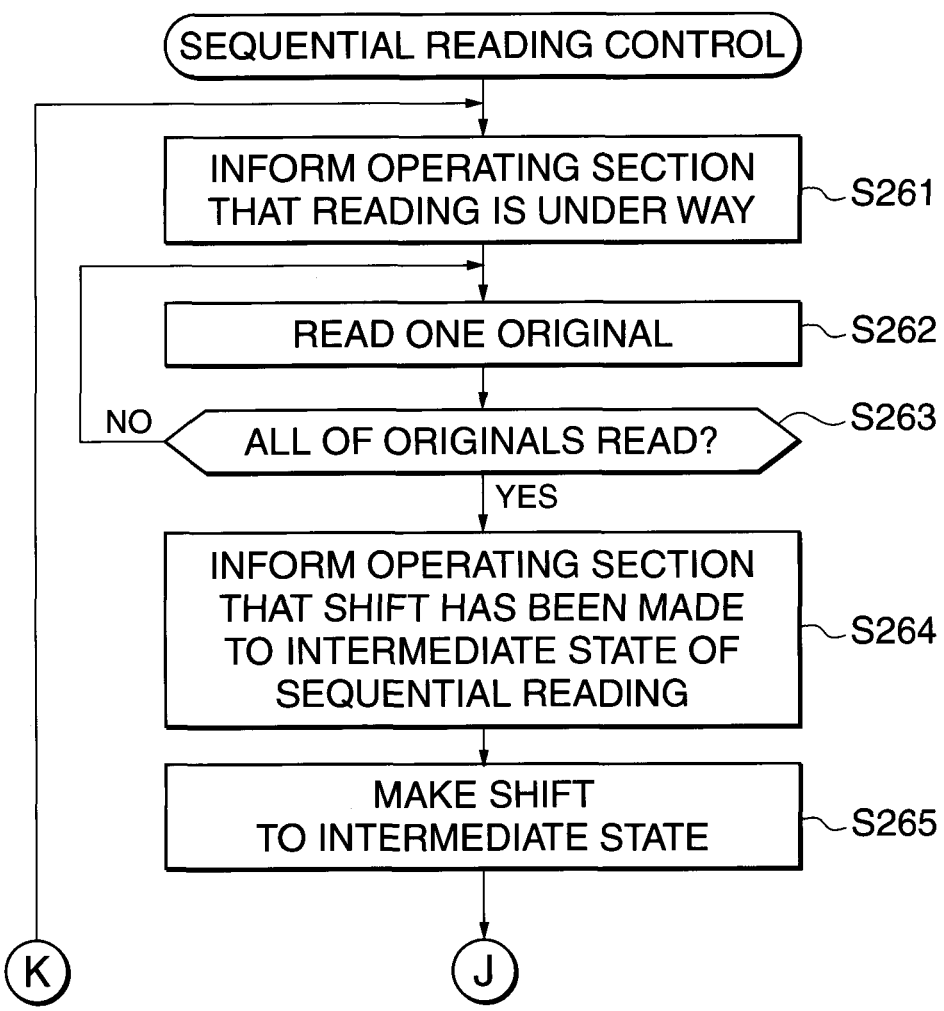
FIGS. 27A-27B are flow chart showing the procedure for carrying out sequential reading in FIG. 26.
Figure 27B:
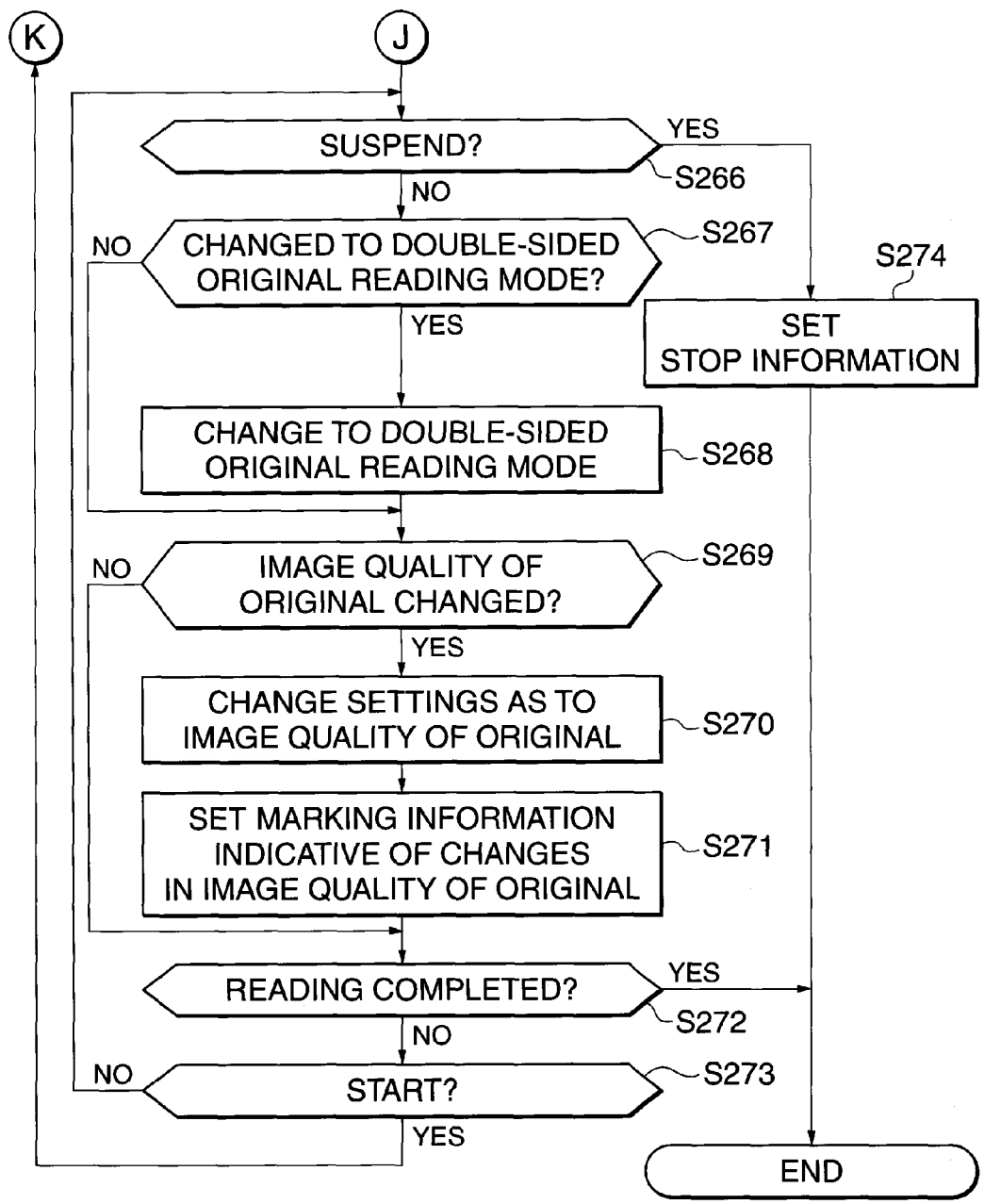
Figure 28:
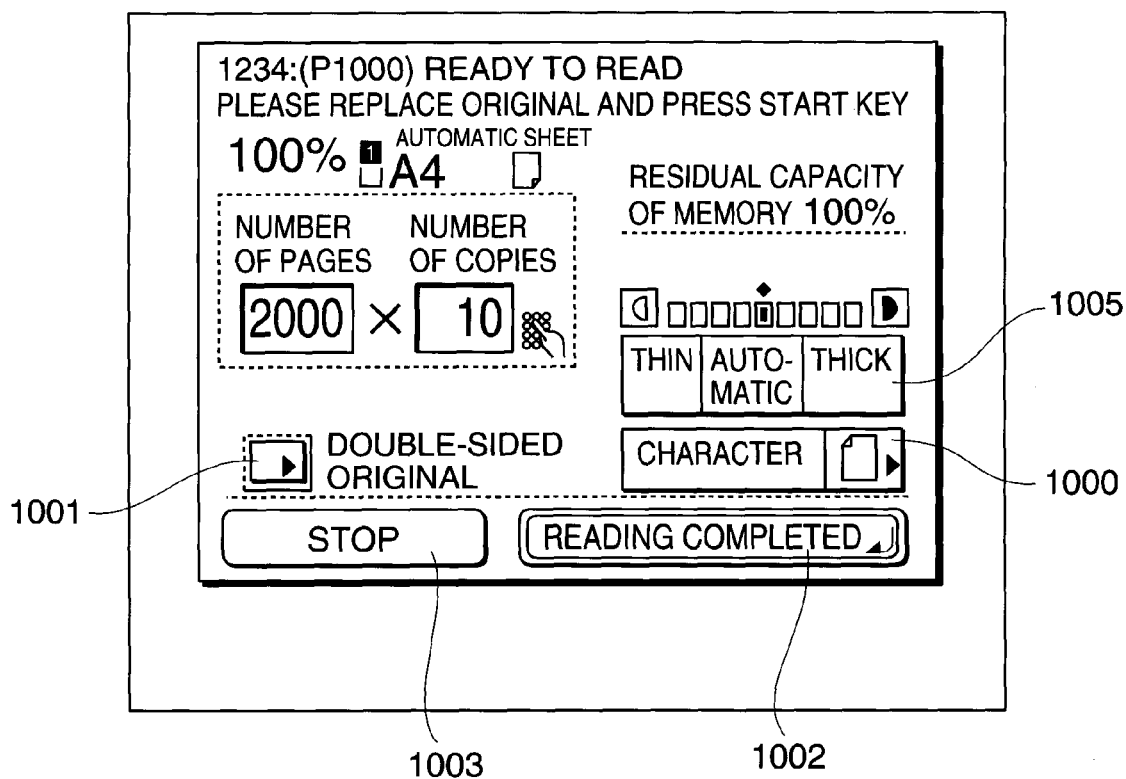
FIG. 28 is a view showing an example of a screen displayed on the operating section 150 upon shift to an intermediate state of sequential reading in a step S265 in FIGS. 27A-27B.
Figure 29:
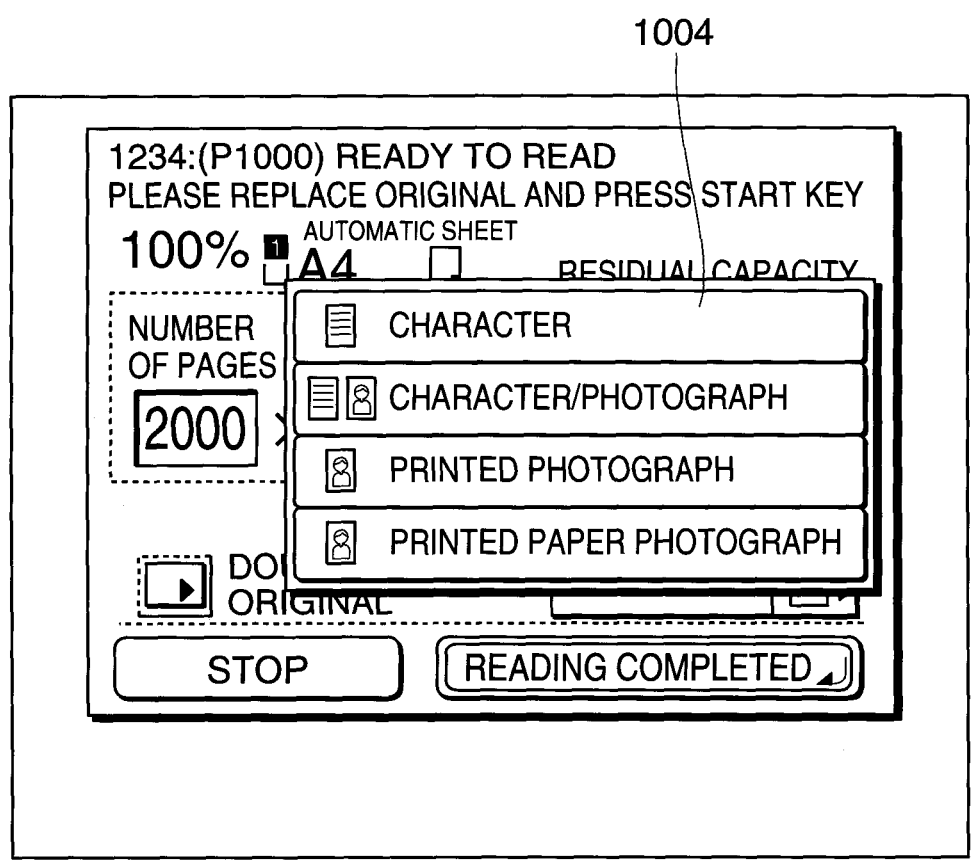
FIG. 29 is a view showing an example of an original type setting popup displayed upon the depression of an original type key in FIG. 28.
Figure 30:
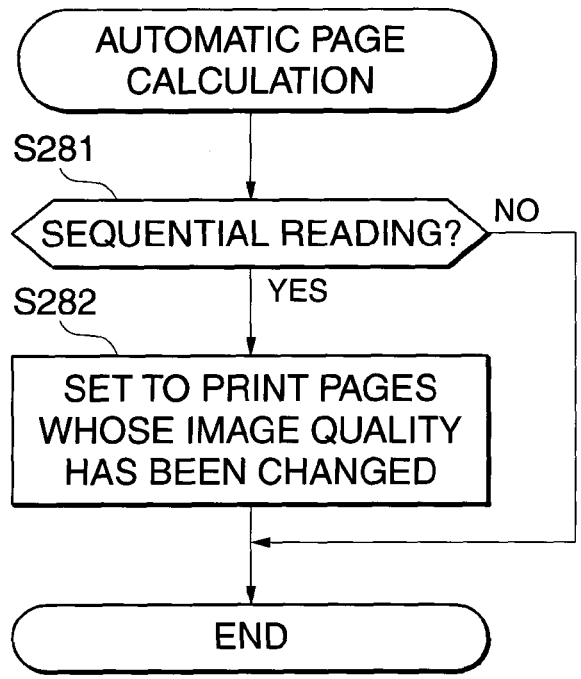
FIG. 30 is a flow chart showing the procedure for carrying out automatic page calculation.
Figure 31A:
FIG. 31A is a view showing an example of a read original whose image quality has been changed, the view useful in explaining the details of processing in a step S282 in FIG. 30.
Figure 31B:
FIG. 31B is a view showing an example of trial copying in the case where the image quality has been changed in FIG. 31A.
Figure 32:
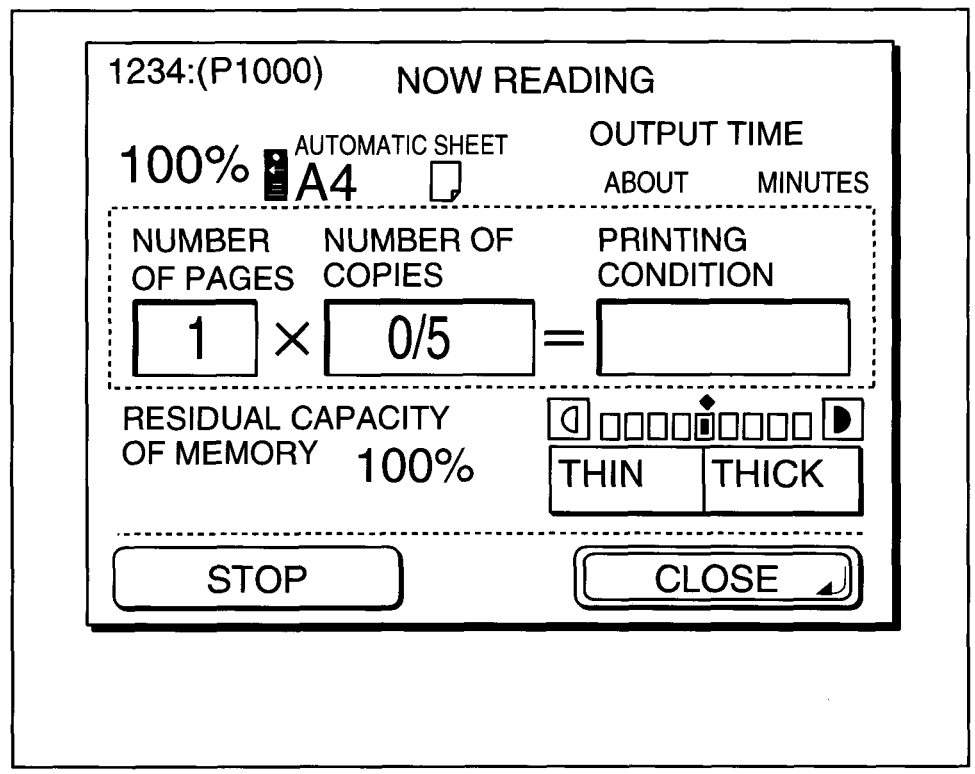
FIG. 32 is a view showing an example of a screen displayed on the operating section 150 upon the start of a sequential reading sequence in a step S254 in FIG. 25.

A description will now be given of a second embodiment of the present invention with reference to FIGS. 25 to 32. FIGS. 25 and 26 are flow charts showing the procedure for providing idling control in an image input/output system according to the present embodiment, FIGS. 27A-27B are flow chart showing the procedure for carrying out sequential reading in FIG. 26, FIG. 28 is a view showing an example of a screen displayed on the operating section 150 upon shift to an intermediate state of sequential reading in a step S265 in FIGS. 27A-27B, FIG. 29 is a view showing an example of an original type setting popup displayed upon depression of an original type key in FIG. 28, FIG. 30 is a flow chart showing the procedure for carrying out automatic page calculation, FIG. 31A is a view showing an example of read originals whose image qualities have been changed, the view being useful in explaining the details of processing in a step S282 in FIG. 30, FIG. 31B is a view showing an example of trial copying in the case where the image quality has been changed in FIG. 31A, and FIG. 32 is a view showing an example of a screen displayed on the operating section 150 upon the start of a sequential reading sequence in a step S254 in FIG. 25.

A description will now be given of the case where trial copying is applied to a sequential reading mode according to the present embodiment. The sequential reading mode is a mode in which a plurality of originals are sequentially read and printing is started after all of the originals have been read. The sequential reading mode is set by depressing a sequential reading mode key 901 displayed on the application mode setting screen in FIG. 12.

First, a description will be given of idling control according to the present embodiment with reference to FIGS. 25 and 26. During the idling control according to the present embodiment, processing in steps S241 to S252 is identical with the processing in the steps S51 to S62 performed during the idling control according to the first embodiment, and the present embodiment differs from the first embodiment in processing from a step S253 onward. Therefore, a description will be given only of different processing with duplicate description of the same processing being omitted.

During the idling control according to the present embodiment, as shown in FIG. 25, if it is determined in the step S252 that the start key 607 has been depressed, the process proceeds to the step S253 in FIG. 26 wherein it is determined whether the sequential reading mode has been set or not. If it is determined in the step S253 that the sequential reading mode has been set, a sequential reading sequence is started in a step S254.

In the sequential reading sequence, as shown in FIGS. 27A-27B, the operating section control task is informed first in a step S261 that reading is under way. As a result, a message indicative of the fact that reading is under way is displayed on the LCD 600 of the operating section 150 as shown in FIG. 32. In the next step S262, an image on one original is read. If the original is a thick sheet original, a scanner scans the original, and if the original is a feeder original, a feeder is driven to read the image thereon and then the original is replaced with another one. The process then proceeds to a step S263 wherein it is determined whether all of stacked originals have been read or not. In the case of a thick sheet original, it is always read only one time, and, the process proceeds to the step S264 when one original has been read. In the case of feeder originals, reading continues until all of a bundle of originals stacked on the feeder have been read, and the process proceeds to the step S264 when all of the originals have been read.

In the step S264, the operating section control task is informed that the shift has been made to the intermediate state of sequential reading, and in the next step S265, the shift is made to the intermediate state of sequential reading. On this occasion, a screen in FIG. 28 is displayed on the operating section 28.

In the next step S266, it is determined whether a stop key 1003 has been depressed on the screen in FIG. 28 or not. If it is determined in the step S266 that the stop key 1003 has been depressed, the process proceeds to a step S274 wherein stop information is set, so that upon completion of this subroutine, each task is brought to an end.

If it is determined in the step S266 that the stop key 1003 has not been depressed, the process proceeds to a step S267 wherein it is determined whether a double-sided original key 1001 has been depressed or not. Specifically, it is determined whether the set way of reading an original has been switched to double-sided reading or one-sided reading. If it is determined in the step S267 that the double-sided original key 1001 has been depressed, a double-sided original reading mode is reset in a step S268, and the process then proceeds to a step S269. On the other hand, if it is determined in the step S267 that the double-sided original key 1001 has not been depressed, the process directly proceeds to the step S269 with the step S268 being skipped.

In the step S269, whether the image quality of the originals has been changed or not is determined according to whether an original type key 1000 and/or a density key 1005 has been depressed on the screen in FIG. 28. Here, a change in image quality of an original means a change in type and/or density of the original. If the original type key 1000 has been depressed on the screen in FIG. 28, an original type setting popup as shown in FIG. 29 is displayed to set the type of the original such as character, character/photograph, printed photograph, or printing paper photograph. A desired image quality can be obtained by operating the original type key 1000 and/or the density key 1005.

If it is determined in the step S269 that the image quality of the originals has been changed, the process then proceeds to a step S270 wherein the image quality of the originals is reset. The process then proceeds to a step S271 wherein marking information whose image quality settings have been changed is set for the present original and held. The process then proceeds to a step S272. On the other hand, if the image quality of the originals has not been changed, the process directly proceeds to the step S272 with the steps S270 and S271 being skipped.

In the step S272, it is determined whether a reading end key 1002 has been depressed or not. If it is determined in the step S272 that the reading end key 1002 has been depressed, the process is terminated. On the other hand, if it is determined in the step S272 that the reading end key 1002 has not been depressed, it is then determined in a step S273 whether the start key 607 of the operating section 150 has been depressed or not. If it is determined in the step S273 that the start key 607 has not been depressed, the process returns to the step S266. On the other hand, if it is determined in the step S273 that the start key 607 has been depressed, the process returns to the step S261 to start reading again.

The processing in the above steps S266 to S274 is executed mainly by the operating section control task in the intermediate state of sequential reading.

Upon completion of the above described sequential reading sequence in the step S254, a copying sequence is started in a step S255. The copying sequence is identical with the copying sequence started in the step S81 in FIGS. 8A-8B, and therefore detailed description thereof is omitted. Here, a description will be given of distinctive characteristics of the present embodiment as compared with the automatic page calculating method (refer to FIGS. 13A-13B) according to the first embodiment.

During the automatic page calculation, as shown in FIG. 30, it is determined first in a step S281 whether the sequential reading mode has been set or not, and if it is determined the sequential reading mode has not been set, the process is terminated. On the other hand, if it is determined in the step S281 that the sequential reading mode has been set, the process proceeds to a step S281 wherein a setting is made such that pages for which image quality settings have been changed and which have been marked as described above are calculated, and printing is performed on these pages. The process is then terminated.

A description will now be given of the details of processing in the step S282. For example, it is assumed as shown in FIG. 31A that originals A to L have been read, and different image quality settings have been made for respective hatched ones of these originals A to L. It is assumed here that the originals A, B, and C have been read according to certain image quality settings, but the subsequent originals D and E have been read according to different image quality settings. In this case, the user may wish to confirm only the ones whose image quality settings have been changed, and hence, as shown in FIG. 31B, a setting is made such that the top original D among the originals whose image quality settings have been changed next to the top original A is subjected to trial copying. Similarly, the originals F and K are also subjected to trial copying.

As described above, printing is performed only on a part of originals whose image quality settings have been changed, and hence the user can quickly confirm settings by partial trial copying.

Although in the present embodiment, the range of trial copying is determined only in the case where image quality settings have been changed in the intermediate state of sequential reading, the present invention is not limited to this, but trial copying may be carried out in the case where the mode has been changed to other modes such double-sided reading. Further, even if settings have not particularly been changed, a page immediately after the shift to the intermediate state of sequential reading may always be subjected to trial copying. The way of controlling in these alternative cases can be easily derived from the present embodiment, and therefore description thereof is omitted.

Although in the present embodiment, only the features related to sequential reading have been described for the convenience of explanation, it goes without saying that they may be combined with the first embodiment.

Although in the above described embodiments, the present invention is applied to copying, this is not limitative. For example, in recent years, a so-called box function has been developed for a digital copying machine. The box function is intended to enable image data transferred from a scanner or an external apparatus to be stored on a permanent basis in an image memory such that they may be printed as needed. The trial printing may be applied to print image data stored using this box function.

Further, the trial printing may be applied to the case where facsimile data is received and temporarily stored in a memory and the image data is printed through user's operation.

As described above, the present invention may be applied to all kinds of apparatuses capable of making predetermined mode changes each time an image stored in a memory is read out and printed.

It is to be understood that the object of the present invention may also be accomplished by supplying a system or an apparatus with a storage medium (or a recording medium) in which a program code of software which realizes the functions of either of the above described embodiments is stored, and causing a computer (or CPU or MPU) of the system or apparatus to read out and execute the program code stored in the storage medium. In this case, the program code itself read from the storage medium realizes the functions of either of the above described embodiments, and hence the program code and a storage medium on which the program code is stored constitute the present invention. Further, it goes without saying that the functions of either of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of either of the above described embodiments may be accomplished by writing the program code read out from the storage medium into an expansion board inserted into a computer or a memory provided in an expansion unit connected to the computer and then causing a CPU or the like provided in the expansion board or the expansion unit to perform a part or all of the actual operations based on instructions of the program code.

What is claimed is:

1. A printing system having a printing unit, the printing system comprising:
a memory;
a microprocessor connected to the memory, which stores instructions that cause the microprocessor to execute:
a first control task that performs a first trial-printing or a second trial-printing, the first trial-printing being performed by the printing unit, by which one set of a job requiring printing of a plurality of sets each having a plurality of pages in accordance with a job processing condition is performed, the second trial-printing mode being performed by the printing unit, by which part of the plurality of pages of the one set of the job is performed in accordance with the job processing condition;
a second control task that causes, after trial-printing is performed, the printing unit to perform printing of remaining set of the plurality of sets not printed by the first trial-printing in accordance with the job processing condition, without a user intervention of changing a number of print sets;
a third control task that causes, after the second trial-printing mode is performed, the printing unit to perform printing from a first page of the one set of the job in accordance with the job processing condition, without a user intervention of changing the number of print sets; and
a fourth control task that restricts performing of the second-trial printing and permits performing of the first-trial printing in a case where the job processing condition includes a predetermined condition,
wherein the predetermined condition is a condition for performing double-sided printing, a condition for performing a reduced layout, or a condition for performing a binding process.

2. The printing system according to claim 1, wherein the second control task causes, if the job processing condition is changed after the first trial-printing is performed, the printing unit to perform printing from the first page of the one set of the job in accordance with the job processing condition, without a user intervention of changing the number of print sets.

3. The printing system according to claim 1, wherein the microprocessor is further programmed to execute a specifying task that specifies the number of pages printed by the second trial-printing in the plurality of pages corresponding to the one set of the job.

4. The printing system according to claim 1, wherein:
the microprocessor is further programmed to execute a suspending task that suspends a printing operation after the first trial-printing or the second trial-printing is completed,
wherein the job processing condition for the job is changeable via a user interface when the printing operation is suspended.

5. A method of controlling a printing system having a printing unit, the method comprising:
a first control step of performing a first trial-printing or a second trial-printing, the first trial-printing being performed by the printing unit, by which one set of a job requiring printing of a plurality of sets each having a plurality of pages in accordance with a job processing condition is performed, the second trial-printing being performed by the printing unit, by which part of the plurality of pages of the one set of the job is performed, in accordance with the job processing condition;

a second control step of causing, after the first trial-printing is performed, the printing unit to perform printing of remaining set of the plurality of sets not printed by the first trial-printing in accordance with the job processing condition, without a user intervention of changing a number of print sets;

a third control step of causing, after the second trial-printing is performed, the printing unit to perform printing from a first page of the one set of the job in accordance with the job processing condition, without a user intervention of changing the number of print sets; and a fourth control step of restricting performing of the second-trial printing and permitting performing of the first-trial printing in a case where the job processing condition includes a predetermined condition, wherein the predetermined condition is a condition for performing double-sided printing, a condition for performing a reduced layout, or a condition for performing a binding process.

6. A non-transitory storage medium computer-readably storing a computer program executable by a microprocessor of a printing apparatus to execute a method comprising:

a first control step of performing a first trial-printing or a second trial-printing, the first trial-printing being performed by a printing unit, by which one set of a job requiring printing of a plurality of sets each having a plurality of pages in accordance with a job processing condition is performed, the second trial-printing being performed by the printing unit, by which part of the plurality of pages of the one set of the job is performed, in accordance with the job processing condition;

a second control step of causing, after the first trial-printing is performed, the printing unit to perform printing of remaining set of the plurality of sets not printed by the first trial-printing in accordance with the job processing condition, without a user intervention of changing a number of print sets;

a third control step of causing, after the second trial-printing is performed, the printing unit to perform printing from a first page of the one set of the job in accordance with the job processing condition, without a user intervention of changing the number of print sets; and a fourth control step of restricting performing of the second-trial printing and permitting performing of the first-trial printing in a case where the job processing condition includes a predetermined condition, wherein the predetermined condition is a condition for performing double-sided printing, a condition for performing a reduced layout, or a condition for performing a binding process.

* * * * *